Nov. 13, 1945.  A. J. SMITH  2,388,876
ARTICLE FORMING APPARATUS
Filed Feb. 7, 1940  7 Sheets-Sheet 6
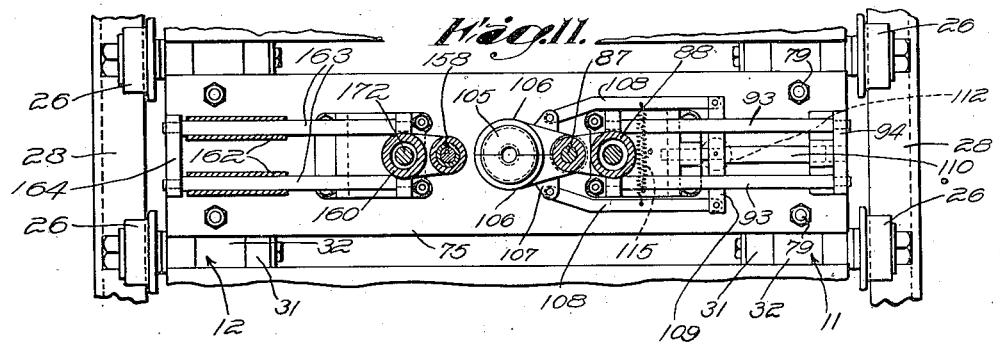
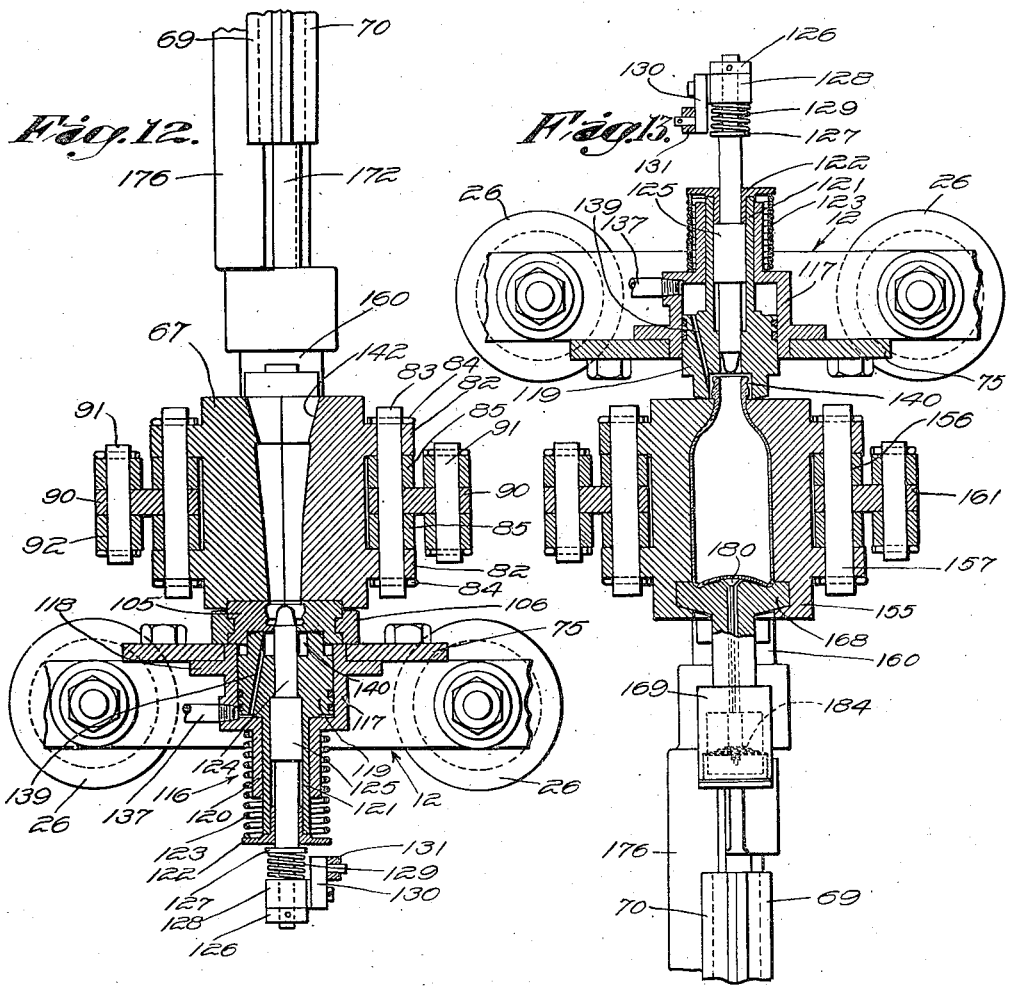

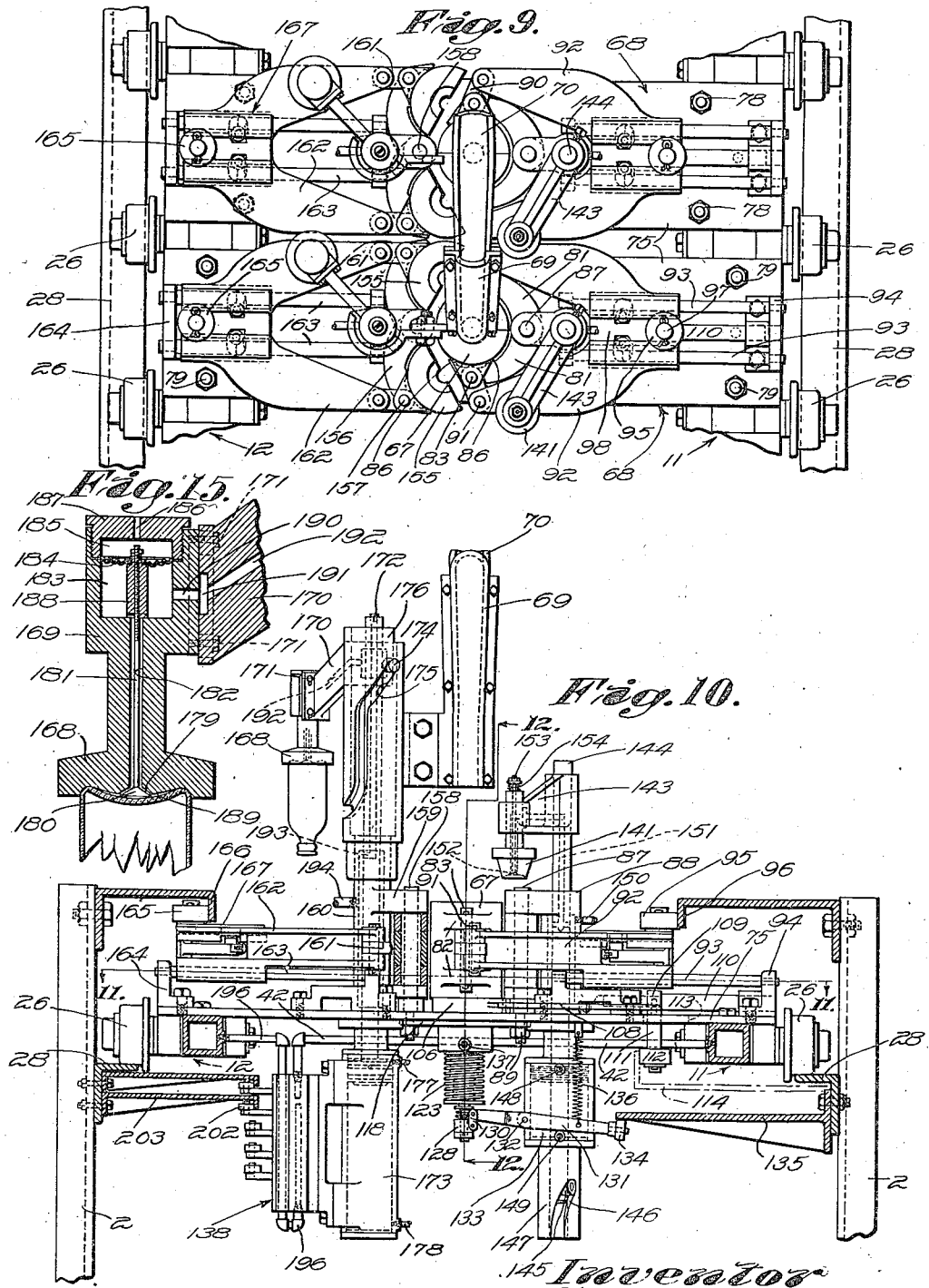

Nov. 13, 1945.   A. J. SMITH   2,388,876
ARTICLE FORMING APPARATUS
Filed Feb. 7, 1940   7 Sheets—Sheet 7

Patented Nov. 13, 1945

2,388,876

UNITED STATES PATENT OFFICE 2,388,876

ARTICLE FORMING APPARATUS

Algy J. Smith, Hartford, Conn., assignor to Hartford-Empire Company, Hartford, Conn., a corporation of Delaware Application February 7, 1940, Serial No. 317,743

36 Claims. (Cl. 49—5)

The present invention relates to article forming apparatus of the type which may be used for forming articles from plastic material, such as glass. More specifically the invention relates to forming apparatus of the continuous chain type by which glass articles, such as narrow neck bottles, may be formed at a rapid rate.

In the past, continuous chain type machines have been devised and used to some extent for forming hollow articles, such as electric light bulbs, the articles being produced at relatively high rates, in the order of several hundred per minute. All such commercial machines have, however, suffered from certain limitations because portions of the operating means used in forming each article were carried by one conveyor, while other portions thereof were carried by a second, and even a third or fourth conveyor. The conveyors had operative runs approaching one another at certain zones for the production of articles. Due to this arrangement, the several elements required in the forming of articles were idle a large proportion of the time. These arrangements were resorted to due principally to two difficulties incident to the use of chain-type machines; first, the difficulty of supplying glass to the machines during the continuous and rapid movement thereof, and, second, the difficulty of supplying the one or more fluids used in or in connection with the forming of the articles to the several operating units also during the continuous movement of those units. These difficulties are to a large extent, if not completely, overcome by the present invention.

Among the objects of the present invention are to provide an article forming machine as aforesaid wherein a plurality of complete article forming units are carried continuously by a single chain-type conveyor moving in a noncircular orbital path.

A further object of the invention along this line is to provide an apparatus by which bottles of the narrow-neck type may be completely formed in each of a plurality of moving units carried by a single conveyor as aforesaid and during the continuous movement of that unit around a major portion of the circuit of the conveyor path.

Another object of the invention is to provide for the supplying to each of a plurality of article forming units of one or more fluids at one or more different pressures, continuously during the continuous movement of the units on the conveyor in its orbital path as aforesaid.

A further object along the same line is to provide for the supplying of a fluid at a desired pressure to all units of the continuously moving conveyor as aforesaid in such manner that the fluid under pressure can be employed by any and all units at any desired time as for operating pneumatically operated mechanisms carried by those units and employed in actuating certain of the operating instrumentalities thereof.

A further specific object of the present invention is to provide an endless conveyor chain for carrying a plurality of operating units wherein one or more fluids may be continuously supplied to a chamber within and extending completely through the chain from a sprocket wheel about which the chain passes, means being provided so that the fluid is not lost from the portions of the sprocket wheel not in contact with any links of the chain, and further means being provided by which the fluid may flow from each link of the chain to the next without substantial loss by leakage or otherwise at the joints between the several links.

A further object of the present invention is to provide a drive for a sprocket chain conveyor having relatively large links (in respect to the diameter of the sprocket) in which the chain is to be moved continuously and at a uniform speed without loping, particularly by providing a stationary guiding means for the chain in its approach to the driving sprocket which will control the position of the links up to the time they are respectively in such contact with the sprocket that there will be no relative movement between the links and the sprocket upon the release of the links from the control of the stationary guiding means.

A further general object of the present invention is to provide suitable means by which a plurality of article forming units moving continuously on a chain-type conveyor may be supplied with separated charges of plastic material in a moldable condition, specifically by providing a stationary inclined charge-guiding means or chute along which the charges are supplied, of which at least the lower or delivery portion lies in the vertical plane including the path of the units to be supplied, in coordination with charge-guiding means moving with the units at least during the charging thereof for guiding the charges from the stationary chute into the several units.

A further object of the present invention is to provide certain novel mechanisms for use in the individual article forming units, particularly a combined blow head and neck pin device effective during the supplying of a charge of plastic material to the blank mold to form an initial opening in the neck end thereof, then for supplying counterblowing pressure to complete the forming of a blank or parison in the blank mold and thereafter for supplying final blowing pressure to expand a blank or parison to final form in the blow mold. The last of these operations is effected either with or without the neck ring in contact with the neck portion of the article being formed.

A further specific object of the invention is to provide a combined takeout head and final blow bottom plate or baffle, wherein vacuum is used for retaining the completed article in contact with this head to facilitate the removal of the article from the final blow mold to a desired delivery point or zone, and particularly wherein provision is made so that the vacuum applied through the head is effective on a relatively large portion of the bottom of the completed article, while deformation or marking of the bottom portion of this article is prevented by closing all apertures through the head during the time the article is being expanded to final form in the blow mold.

A further object of the invention is to provide a chain type machine as aforesaid, wherein the chain moves in a path located in a substantially vertical plane having substantially horizontal upper and lower runs, the forming of the article taking place throughout a major portion and preferably substantially the whole path of the chain. A more specific object in the case of forming hollow articles from plastic material, such as glass, in a two-mold type of forming unit, including a blank mold and a blow mold, is to provide apparatus such that the blank mold will be in a position to be supplied with charges of plastic material through its open bottom end, which is uppermost during the movement of the forming unit through the upper run of the conveyor and to provide operating and timing means so constructed and arranged that the blank or parison may be transferred neck-end-uppermost from the blank mold to the blow mold during the movement of the unit through the lower run of the conveyor, so that the reheat and stretching of the blank by gravity will occur with the blank neck-up.

It is a further object in this connection to so arrange the apparatus that the removal of the completed article from the final blow mold will take place after the forming unit has passed from the lower to the upper run of the conveyor path.

Other and more detailed objects of the present invention will become apparent from the following description of a preferred embodiment thereof and from the appended claims, when taken in connection with the accompanying drawings in which:

Fig. 8 is an enlarged fragmentary detail view of one of the links of a conveyor chain, showing particularly the means for supplying vacuum to this chain, and the means by which fluid may flow from one link to another therein;

Fig. 9 is a view in plan of two of the article forming units and a portion of the chain conveyor by which they are carried;

Fig. 10 is a transverse view taken substantially on the line 10—10 of Fig. 1 and showing an article forming unit with parts principally in elevation;

Fig. 11 is a detail view in horizontal section substantially on the line 11—11 of Fig. 10, illustrating particularly the neck ring operating mechanism of the forming unit;

Fig. 12 is a detail view substantially in vertical section on the line 12—12 of Fig. 10 and on a somewhat larger scale, illustrating the blank mold and associated mechanisms in position for the supplying of a charge of plastic material thereto;

Fig. 13 is a detail vertical sectional view, taken substantially in the same plane as that of Fig. 12, but with the blow mold closed and an article finally blown therein;

Fig. 14 is a fragmentary detail view, substantially in plan, illustrating the safety means used in conjunction with the mold opening and closing means for the blank and blow molds;

Fig. 15 is a fragmentary detail view, substantially in central vertical section, illustrating the combined blow mold baffle or bottom plate and takeout head showing the interior construction thereof;

Fig. 16 is a detail view of the timer with certain of the valve chambers broken away and shown in central vertical section;

Fig. 17 is a vertical sectional view of the timer taken substantially on the line 17—17 of Fig. 18;

Fig. 18 is a horizontal sectional view of the timer showing the construction and operation of one of the valves thereof, the view being taken substantially on the line 18—18 of Fig. 16;

Figure 1:
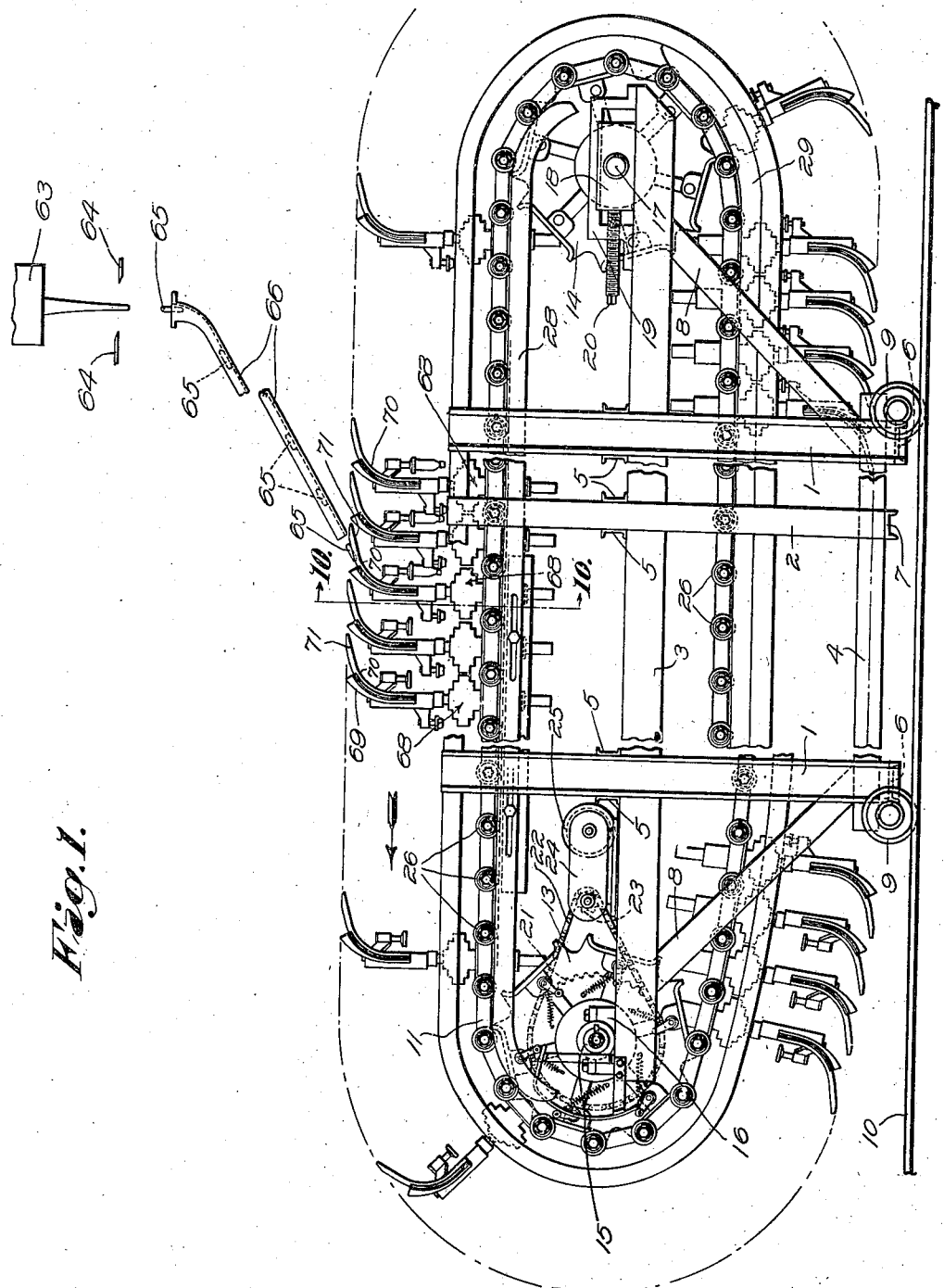
Figure 1 is a general view in side elevation of the entire machine, portions of the machine being broken out and omitted for space requirements, and only a few of the article forming units being indicated diagrammatically.

The apparatus of the present invention includes many features applicable not only to the particular machine illustrated in the drawings and hereinafter to be particularly described, but also to many types of devices, some of which do not necessarily pertain even to article forming machines. It will be pointed out in describing the various features and functions of the particular embodiment of the invention wherein certain of these features have relatively broad applicability.

While the present invention is illustrated as embodied in a forming machine for the making of glass bottles of the narrow neck type, it is contemplated that many of the principles thereof hereinafter to be described and which are embodied in the present machine may be equally well applied to the making of many other types of articles, for example from other types of plastic materials known to the art. The only limitations, therefore, upon the intended scope of the invention is its practical applicability to uses other than that herein particularly described in different types of machines.

*General arrangements of machine and drive*

Turning now to the accompanying drawings, there is illustrated in Fig. 1 a forming machine of the continuous endless chain type, i. e., wherein a plurality of similar operating units, in this case for forming glass bottles of the narrow neck type, are carried upon a pair of endless chains forming a single conveyor of the endless chain type and moving in a non-circular orbital path.

The machine is built upon a stationary frame work preferably of structural metal, including uprights 1 and 2, longitudinally extending members 3 and 4 connecting the upright members, and transverse members 5, 6 and 7. This frame work also includes inclined brace members 8. The frame work as a whole is shown mounted upon wheels 9 arranged to roll upon suitable tracks 10 to facilitate the movement of the machine as may be necessary in the manufacturing plant in which it is being used.

The chains making up the conveying means of the present machine are indicated generally at 11 and 12 for the forward and rear chains respectively, Figs. 1, 9 and 10, these chains passing around a pair of drive sprockets, including a forward sprocket 13 and a rear sprocket axially aligned therewith (not shown) and also around a pair of idler sprockets including a forward sprocket 14 and a rear sprocket axially aligned therewith (not shown).

The drive sprockets, including the sprocket wheel 13, are rigidly mounted upon a transverse shaft 15, which is journaled in suitable pillow blocks 16 mounted upon the longitudinal structural members 3. The idler sprockets at the other end of the chain path, including the sprocket 14, are mounted upon a transverse shaft 17 which is journaled adjacent to its ends in slide blocks 18. The slide blocks 18 are arranged for longitudinal adjustive movement in guides formed in brackets 19 secured to the structural members 3. Suitable lag screws 20 are threaded through portions of the brackets 19 and bear upon the slide blocks 18 for adjusting the tension on the chains 11 and 12 in the well known manner.

Means are provided for positively rotating the shaft 15 and the drive sprocket 13 carried thereby. For this purpose, the shaft 15 is provided at the rear of the machine, as shown in dotted lines, with a sprocket wheel 21 arranged to be driven by a chain 22 passing around a smaller sprocket wheel 23 of a speed changing device 24. This speed changing device has a driving wheel 25 arranged to be driven from any suitable source of power, such for example as an electric motor (not shown). The driving means shown and described is substantially conventional in nature and merely intended to illustrate any means by which a continuous rotation may be imparted to the shaft 15 and the sprocket wheels carried thereby, preferably at an adjustably variable speed. Any other means effective to drive this shaft in this manner is to be considered within the purview of the present invention.

*Chain guiding and non-loping arrangements*

Figure 6:
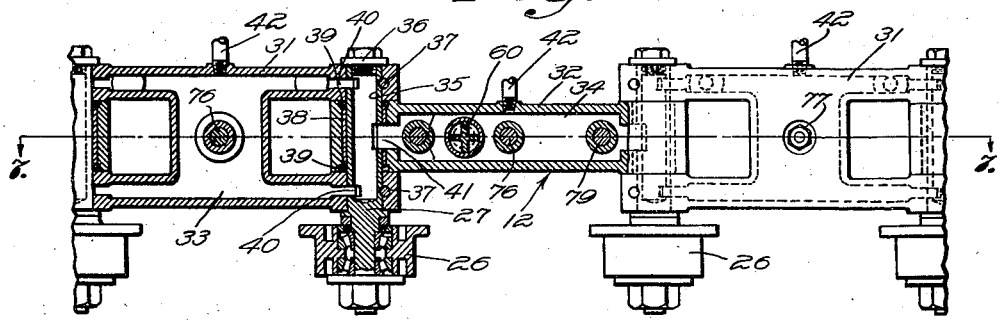
Fig. 6 is a detailed view, principally in section, on the line 6—6 of Fig. 7, showing the chain construction and the fluid passage therethrough.

As shown in Figs. 1, 2, 4 and 6, the chains 11 and 12 carry rollers 26 journaled on the pivot pins 27, Fig. 6, connecting the several links of the chain as hereinafter more particularly described. Suitable rails or guiding means, generally indicated at 28, are provided upon which these rollers are arranged to travel during the movement of the conveyor through the upper, substantially horizontal run of the conveyor path. Somewhat similar rails 29 are provided for the rollers 26 during their movement through the lower run of the conveyor path. It is noted, however, that the guide members 29 do not extend to the left, as seen in Fig. 1, up to a point adjacent to the driving sprocket 13, but rather stop short of this sprocket, so as to permit a sagging of the chain intermediate its movement off the sprockets 13 and up to the point it comes under the control of the guide rails 29. This automatically accommodates normal changes in the length of the chain due to expansion and contraction caused by changes in temperature. Changes may also be compensated for by adjustment of the lag screws 20. This arrangement is best illustrated in the diagrammatic view, Fig. 19, wherein the path of the chain is shown in dot and dash lines. The rails or guiding means 28 and 29 are suitably secured to the frame of the machine, for example by bolts, as shown in Fig. 10.

A major difficulty which has been met with in the past in driving sprocket and chain-type conveyors wherein the links of the chain are relatively large in respect to the diameter of the driving or carrying sprockets, has been that the path of the pivotal points between the chain links in the rotation of the sprocket is different from the path of the center portions of these links. As a result, when one link of a chain is in contact with a sprocket, so that the pivotal point at the end of this link toward the direction from which the chain is travelling is fixed in respect to the sprocket, the opposite end of the next link to engage the sprocket is out of definite control of the sprocket or other guiding means. As a result, there is a pivotal movement of this next link with respect to the contiguous link contacting the sprocket toward a position in contact with the sprocket. When this next link does contact with the sprocket, the position of the pivotal point at the controlling end of this link is at a position nearer the radius of the sprocket parallel to the chain path than it will subsequently be during the continued rotation of the sprocket. The leverage action of the sprocket in pulling the chain thus changes during the movement of each link thereonto. As a result of this, the chain is drawn along with a sort of "loping" action instead of a smooth uniform movement, even though the sprocket is continuously rotated at a constant speed.

Various arrangements have been proposed to overcome this difficulty, one of which, for example, is to provide a drive for the sprocket at a non-uniform speed by a pair of deformed gears. Another arrangement is to pass a chain around a pair of sprockets both of which are idlers and to drive it by an intermediate sprocket contacting with the chain intermediate the ends of one of the straight courses thereof. Both these arrangements involve additional expense of construction and/or operation and may also be subject to other difficulties.

Figure 4:
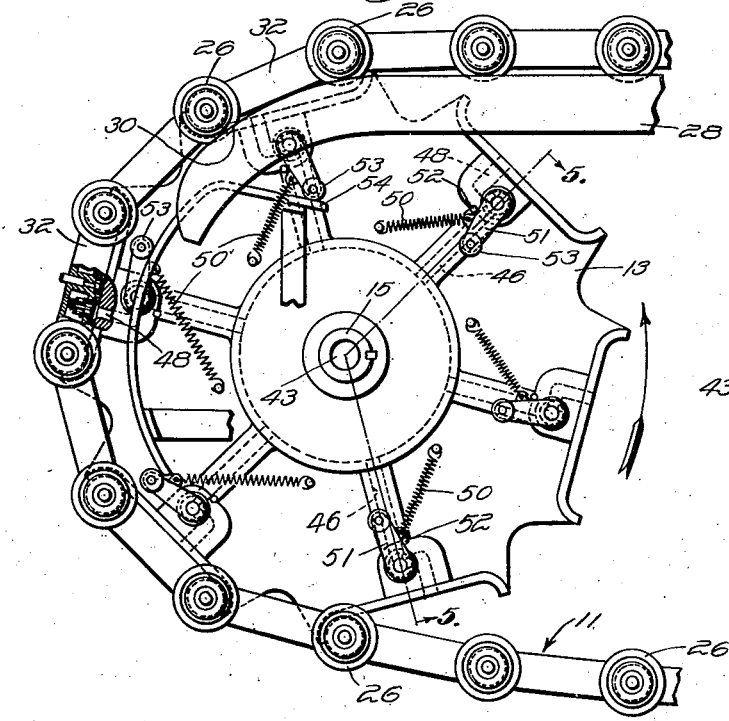
Fig. 4 is an enlarged detail view of one of the driving sprockets illustrating the manner of guiding the conveyor chain thereonto and the means providing for the flow of a fluid between the sprocket and the interior of the chain.

The present invention provides a novel arrangement by which this loping is overcome in that the rails or guiding members 28 are extended a sufficient distance around the sprocket 13, Fig. 4, to guide the rollers 26 substantially up to a point as shown at 30. Thus, when the rollers 26 are released from the control of the guide rails 28, the chain links with which these rollers are associated are in such relation to the sprocket wheel that there can be no further relative movement between the links and the sprocket wheel. Thus "loping" as above described is positively eliminated by the use of a relatively simple and cheap construction.

It is noted that this feature of the present invention is not limited to an article forming machine, but is applicable to the driving of any sprocket chain by a sprocket wherein it is desired to eliminate the loping above described. The claims directed to this feature are to be construed accordingly.

*Continuous fluid supply to elements carried by conveyor*

A major feature of the present invention is the novel provisions thereof in respect to the supplying of a fluid, possibly under pressure, continuously to all operating units carried by a continuously moving chain-type conveyor. This problem has been a limiting factor heretofore in chain-type machines wherein some designers have found it necessary to utilize only portions of the run of the conveyor where it is going along a straight path, using sliding shoes for transmitting pressure from a series of holes in a stationary chamber through the shoes to elements carried by the conveyor. This arrangement is employed, for example, in the well known "399 machine" now in commercial use in making the glass envelopes for electric light bulbs, as well as in other machines found in the patented art. Other machines of the prior art have utilized only those portions of the conveyor path where the conveyor is travelling in a circular path around a turret, which in those machines has the function of one of the sprocket wheels of the present device. Here the pressure has been brought into the turret axially thereof in a well-known manner and is distributed to the operating elements of the several units carried by the conveyor during the time such elements are travelling around the turret in a circular portion of their path. Both these schemes have suffered from the limitation that only a portion of the conveyor path could be advantageously utilized, while other portions of the path were necessarily idle in so far as the use of fluids is concerned, such fluids including, for example, liquids or gases under desired positive or negative pressures.

The present machine overcomes these difficulties and provides for the continuous supplying of one or more fluids as aforesaid to any and all operating units carried by the conveyor independently of whether the units are travelling in the straight or curved portions of the conveyor path and continuously during the entire movement of the units throughout the entire conveyor path. Furthermore, the present invention provides for the suitable transmission of fluids in a way such that leakage is effectively prevented to an extent that pneumatic pressure may be continuously transmitted to operating units carried by the conveyor in sufficient volume and pressure to operate pneumatically operated mechanisms, such as pneumatic cylinders, carried by the units. The transmission of pneumatic pressure in sufficient volume and at sufficient pressure effectively to operate pneumatic cylinders on a continuously moving conveyor and independently of the position of the unit in question is believed to be novel, as the old methods referred to above of transmitting fluid through sliding shoes during the movement of a conveyor are not practically effective to transmit a fluid at a sufficiently high and continuous pressure to effect such operations. The prior art arrangement might, for example, be adequate to supply a fluid at a pressure of several ounces per square inch, but could not supply air continuously at pressures of 15 to 30 pounds per square inch.

The problem has been solved according to the present invention by providing a continuous hollow space within the links of a chain wherein the space within each link communicates with the spaces within contiguous links to provide a continuous space entirely through the endless chain. To this space fluid may be continuously supplied or exhausted through one or more of the sprocket wheels about which the chain passes, provision being made so that the interior of at least one sprocket wheel may always be open to the interior of at least one link. The present arrangement in fact provides for a continuous fluid flow between the sprocket wheel 13 and the chamber within the chain 11 through at least two links at all times.

Figure 7:
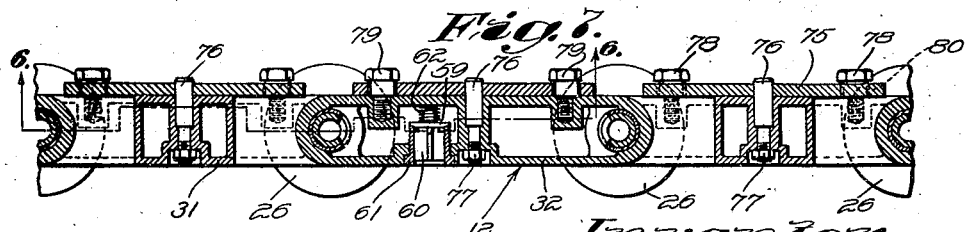
Fig. 7 is a view substantially in vertical section on the line 7—7 of Fig. 6.

Referring now to Figs. 6 and 7, it will be noted that the chain 12 which is similar to the chain 11 is made up of two types of links arranged alternately, including H-links 31 and I-links 32, both these links having chambers therein as shown at 33 and 34 respectively. The links are connected together by the pivot pins 27, as best shown in Fig. 6, these pins being formed hollow as by providing them with a bore extending from one end substantially through the portion within the hinge portion of the links 31, as shown at 35. The bore 35 is plugged at its open end by a suitable screw plug 36. The pins 27 are preferably anchored in the links 31 by means of one or more keys 37 and are rotatably received within bushings 38 in the ends of the I-links 32, suitable packing means, as shown at 39, being provided to prevent loss of fluid along the joints between the links. The bores 35 of the pins 27 communicate with the chambers 33 in the H-links through one or more apertures 40, these apertures being maintained in registry with the passages within the links 31 due to the prevention of relative rotation between the pins 27 and the H-links 31. The bores 35 within the pins 27 also communicate with the chambers 34 of the I-links 32 through relatively wide openings 41 formed in the walls of the pins 27 and in the bushings 38. The openings 41 are of sufficient width so that they will not be closed even when the links 31 and 32 are rotated somewhat relative to one another, as during the passage of the chain around one of the sprockets. Suitable means (not shown) are provided for preventing the rotation of the bushings 38 in respect to the hinge portions in the ends of the I-links 32 in which they are located. All the joints are essentially similar to that just described, so as to provide a continuous chamber or passage through each of the chains 11 and 12.

Obviously, if but one fluid is to be transmitted to units carried by a chain type conveyor, but one hollow link type chain need be provided. In accordance with the present invention, as particularly set forth hereinafter, it is desired that both pneumatic pressure and vacuum be supplied to each of the operating units. For this reason both the chains 11 and 12 are of the type just described, the chain 11 carrying vacuum and the chain 12, pressure. Obviously, if a larger number of different fluids, or the same fluids at different pressures, were needed to be supplied to units carried by a chain-type conveyor, the necessary number of chains could be provided to accommodate the desired number of fluids or the desired fluids at the different pressures required. The fluids may be conducted from each of the links through pipes as shown at 42 to the several units.

Figure 5:
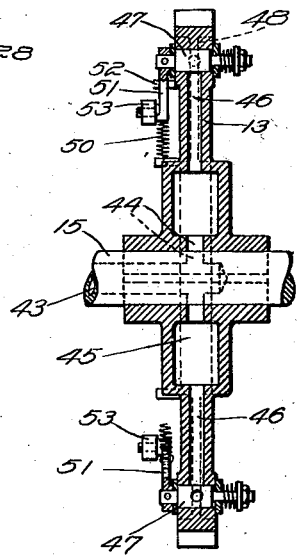
Fig. 5 is a transverse sectional view of the driving sprocket substantially on the line 5—5 of Fig. 4.

Means are provided for transmitting a fluid to and through each drive sprocket and thence to the interior of the links as aforesaid. For this purpose, the fluid used (the transmission of vacuum will be particularly described, Figs. 4 and 5) is transmitted to the sprocket through the drive shaft 15 axially thereof, as by providing a well-known type of swivel connection (not shown) between the stationary fluid passage and the drive shaft, the fluid passing through a bore, as shown at 43, axially of the shaft to a point within the sprocket 13. The fluid then passes through one or more lateral bores indicated at 44 in the shaft and in the hub portion of the sprocket wheel to an annular chamber 45 within the sprocket wheel. This chamber opens to a plurality of substantially radial passages 46 leading toward the periphery of the sprocket wheel. Flow through these passages is controlled by plug valves 47 as shown, the endmost portions of the passages being illustrated as angular at 48, Fig. 4, and opening to the periphery of the sprocket wheel. When one of the I-links 32 is in engagement with the sprocket wheel, as shown for the link illustrated partly in section in Fig. 4, the opening to the passage 48 is opposite a valve controlled passage in the links shown particularly at 49, Fig. 8.

The plug valves 47 in the passages 46—48 in the sprocket wheel 13 are continuously urged toward their closed positions by tension springs 50, Fig. 4, these springs extending between suitable anchorages on the sprocket wheel and arms 51 carried by the rotatable plug portions 47 of the valves. These springs normally keep the valves in predetermined positions with the arms 51 abutting against suitable stops 52 carried by the sprocket wheel. As the sprocket wheel rotates, cam rollers 53 carried by the arms 51 come into contact with a stationary cam 54, causing the opening of the valves at a suitable time against the tension of the springs 50, as shown at the left in Fig. 4, and thus opening communication between the chamber 45 in the sprocket wheel and the passages 48 leading to the periphery of the wheel.

In each link 32 there is a spring-closed, poppet type valve arranged to be opened automatically by the transmission of pressure (or vacuum) to the interior of the link when that link is in fluid-transmitting relation with the sprocket wheel, as aforesaid. Thus, considering the particular example being described, namely, the transmission of vacuum to the chain 11, there is provided a poppet valve 55, Fig. 8, normally held closed by a compression spring 56 extending between a suitable abutment 57 rigid with a fitting carrying this valve and a washer 58 on the valve stem. When vacuum is applied to the passage 49 in this fitting, the valve 55 will be automatically opened against the compression of the spring 56, thus permitting the exhausting of air from the interior of the chain 11 through the sprocket wheel 13. It is noted that while the above structure is for vacuum, it has been described as if a fluid were being supplied to the chain, the parts being the same with the exception of the spring-closed valve in the links of the chain as hereinafter noted.

When the chain in question is being used for the transmission of a liquid or gaseous fluid under pressure, the valves corresponding to the valve 55 of Fig. 8 are somewhat differently arranged and may be as shown in Figs. 6 and 7, wherein a pressure-responsive, spring-pressed poppet valve 59 is provided having webs 60 sliding within a cylindrical portion of a fitting 61, this valve normally being maintained closed by a compression spring 62 extending between the head of the valve and a portion of the link 32. Thus, when a fluid under pressure is supplied to this valve, it will be unseated against the compression of the spring 62 to permit fluid flow into the interior of the chain 12.

Thus, there is provided a means by which a fluid under a desired positive or negative pressure may be transmitted continuously to any operating unit carried by a continuous chain conveyor without loss of that fluid from the sprocket through which it is transmitted, due to the presence of the valves 47, which are closed to prevent the loss of the fluid when the passages controlled thereby are out of contact with one of the links 32 arranged to receive the fluid. Furthermore, loss of fluid from the links out of fluid-transmitting relation with its supplying sprocket is prevented by the spring-pressed check valves associated with these links. In this way, it is possible to supply one or more fluids, at a selected pressure or pressures, continuously to all the operating units carried by a continuously moving conveyor irrespective of the shape of its path.

This feature of the invention is likewise not limited in its application to article forming machines, although it is useful in that connection, but may be applied to any continuously moving chain-type conveyor carrying operating units of any kind, which are to be supplied with a fluid under pressure or at a vacuum. The appended claims directed to this feature of the invention are to be construed accordingly.

*Charge supplying and distributing means*

In continuously moving chain-type machines for forming articles from plastic material, a major problem is the supplying of charges of the material to be worked upon in forming the articles to the fabricating units carried along continuously by the chain conveyor. This problem has been solved in accordance with the present invention.

While the invention broadly relates to the forming of articles from any type of plastic material, the particular embodiment of the invention herein shown and described is a glass article-forming machine. For this reason, means are provided in connection therewith for the supplying of separated charges of molten glass to the several forming units during the continuous movement of those units. This means includes a glass feeding device, generally indicated at 63, which may be a "stream" feeder, and which includes a pair of shears shown diagrammatically at 64. Inasmuch as these elements per se form no part of the present invention, they have not been illustrated in detail and will not be further described. From the point of view of the present invention, the means 63—64 may be considered as a means by which separated charges of molten glass or other plastic material are supplied at predetermined intervals, these intervals each being equal to the interval during which a single forming unit moves along the conveyor path a distance equal to the distance between two contiguous forming units along the conveyor.

The charges of molten glass are supplied downwardly by gravity to a stationary charge guiding means, here shown as a chute 66, the lower or delivery portion of which is in the vertical plane including the path of the molds to be charged, in this case the blank mold 67 of the article forming units generally indicated at 68, Figs. 1, 2, 3, 20 and 21. As shown, the chute 66 is a straight chute, all of which is in the vertical plane including the mold path. The desired result may be attained, however, by the use of a laterally curved chute if the lower or delivery portion is in this vertical plane so that the charges, upon leaving the chute, have a movement in this plane. The blank molds are preferably charged, as herein disclosed, during their movement through a substantially horizontal straight portion of the conveyor path, in this case the upper run of the conveyor.

Figure 2:
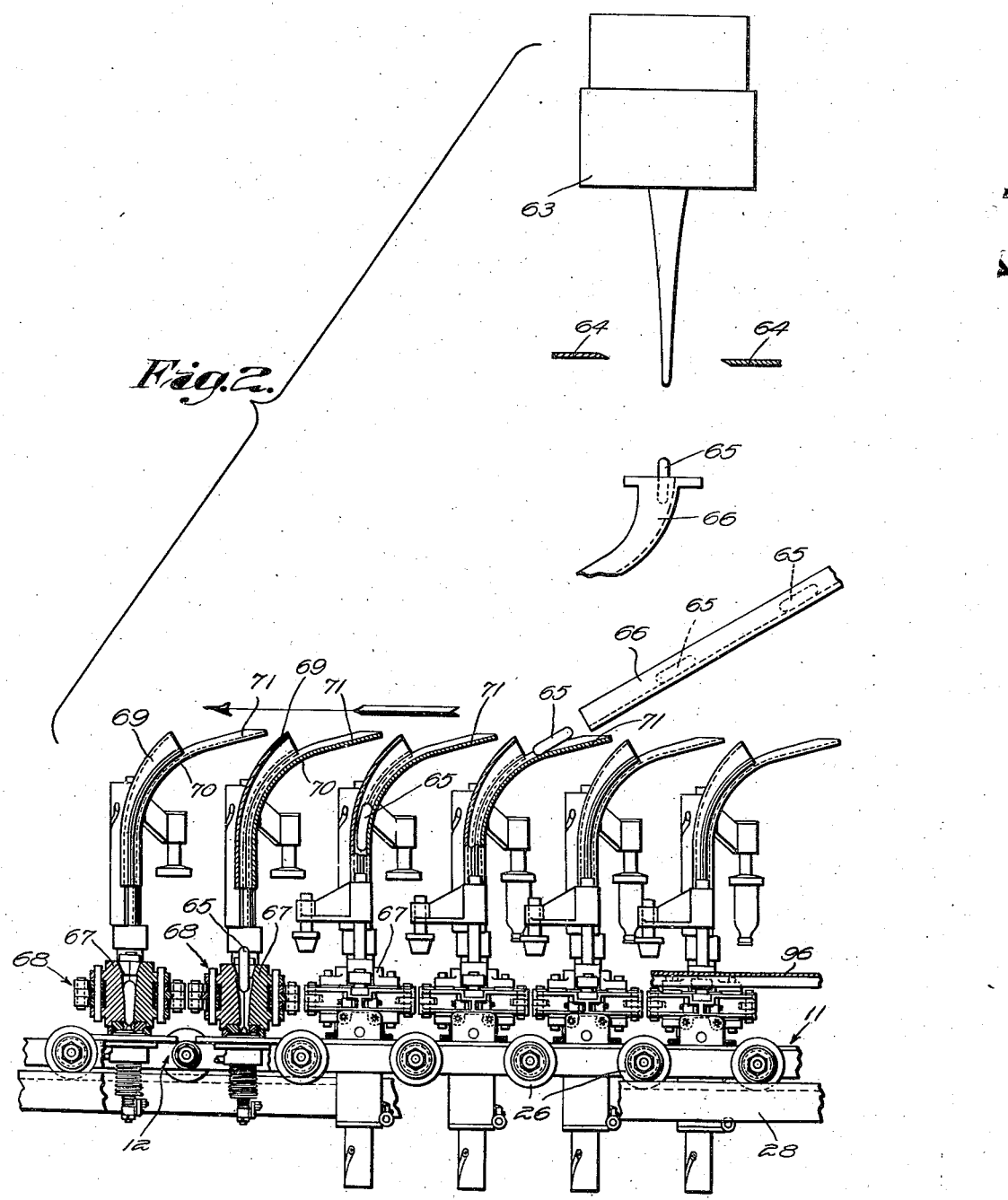
Fig. 2 is a view on a somewhat larger scale of a portion of Fig. 1 illustrating the feeding of charges of plastic material to the several units during the movement thereof, the feeding means and the upper portion of the delivery chute being displaced laterally in order to show them on the same view, and certain of the forming units being shown in part in central vertical section.

Associated with each forming unit 68, at least during the time the molds are being charged, is a charge guiding means, which is shown in its preferred form in Figs. 1 and 2. In these figures, the charge guiding unit comprises a deflector 69 and a chute-type charge guide 70, both of which are rigidly carried by the unit 68, as more particularly described hereinafter. The deflector 69 is arranged to direct charges from the downwardly inclined path which they follow into a vertical path and downwardly into the molds 67 to be charged. The charge-contacting surfaces of the deflectors 69 are concave, considered in the vertical plane including the path of the molds to be charged. The charge guide or chute 70 is positioned to coordinate the guiding of the charges with the deflector 69 and has a charge-guiding surface which is convex in the vertical plane including the path of the molds and including the lower portion of the chute 66. Furthermore, the charge guide 70 has an elongated and rearwardly directed lip portion 71 to permit of some variations in the synchronism between the supplying of charges and the movement of the molds. Preferably, in accordance with the preferred forms of the invention of Figs. 1 and 2, in which both members 69 and 70 are employed, the charges 65 have a velocity incident to their movement down the chute 66, such that the horizontal component of velocity approximates the horizontal velocity of the molds to be charged.

Figure 3:
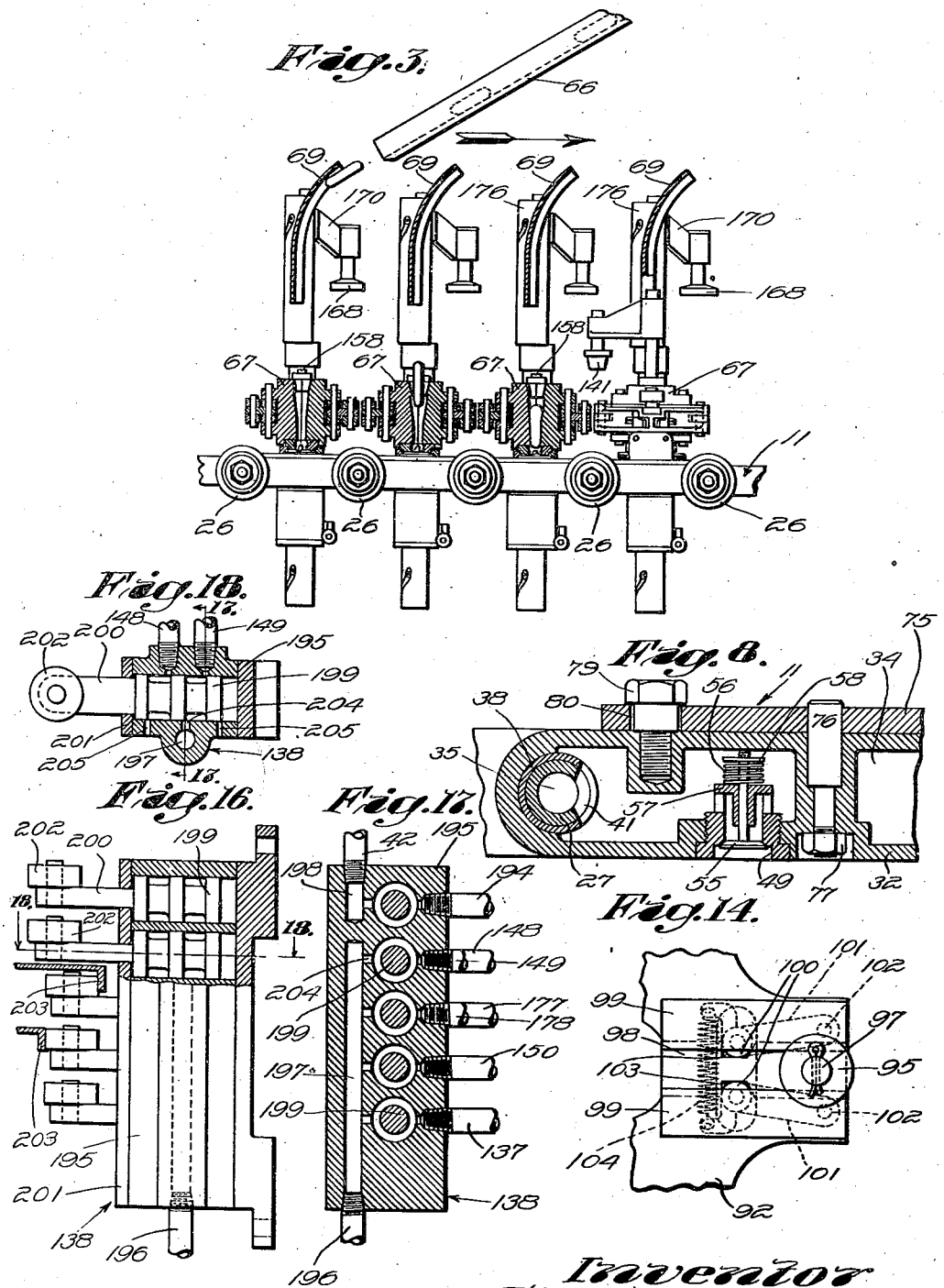
Fig. 3 is a view similar to Fig. 2 showing a modified form of charge-guiding means moving with the molds.
Figure 20:
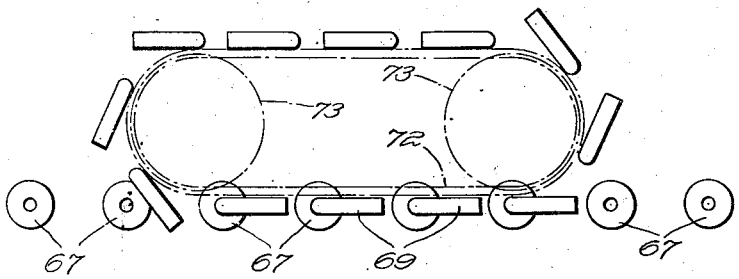
Fig. 20 is a diagrammatic view in plan illustrating a modified form of charge feeding device.
Figure 21:
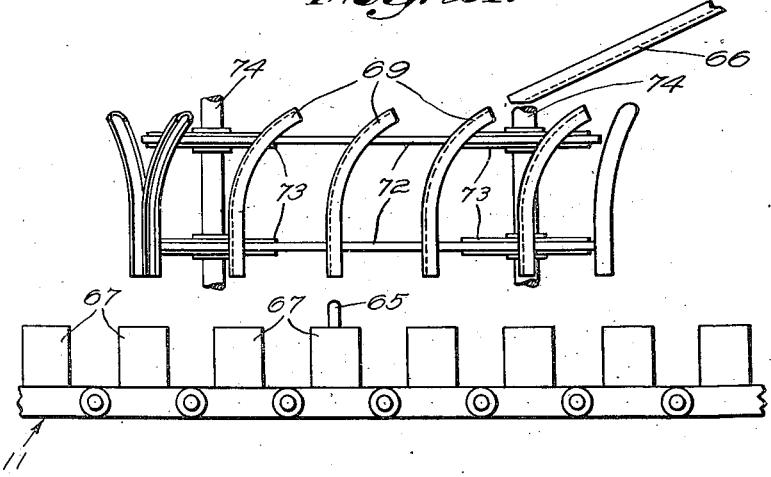
Fig. 21 is a diagrammatic view in elevation of the modified form of charge feeding device shown in Fig. 20.

It is contemplated, however, that some variations may be made in the preferred embodiments of the invention illustrated in Figs. 1 and 2 as to the charge delivery, particularly by omitting the charge guide 70. This embodiment of the invention is illustrated in Figs. 3, 20 and 21. Under these circumstances, it is practically necessary that the horizontal component of velocity of the charges 65 upon leaving the chute 66 be in excess of the horizontal velocity of the molds and the deflectors 69, so that the charges will engage the undersides of the deflectors 69 and be deflected into the molds. This may be accomplished by holding the chute 66 at a somewhat steeper inclination than that shown in Fig. 1, or by providing a somewhat longer run along the chute. It may also be accomplished by arranging the conveyor to move in the direction opposite that shown in Fig. 1, as indicated by the arrow in Fig. 3. This arrangement, however, while operative to feed the charges to the molds, is under certain circumstances not as desirable as the arrangement of Figs. 1 and 2 for the reason that the reversal of the horizontal velocity or velocity component of the charges incident to the movement of the molds to the right, as shown in Fig. 3, while the chute 66 is inclined downwardly to the left, tends in some instances to deform the charges, which may result in an undesirable distribution of the material in the finished article, for example, when making hollow ware, such as bottles, for which the present machine is particularly adapted.

In Figs. 20 and 21, there is illustrated a further embodiment of the invention wherein the deflectors 69, instead of being carried rigidly by the forming unit 68, are mounted on a separate endless conveyor including a pair of sprocket chains diagrammatically illustrated at 72, these chains being suitably arranged for movement about sprocket wheels diagrammatically shown at 73 and mounted on vertical shafts 74 in a suitable manner. Any desired means, not shown, may be provided for driving the conveyor 72 in synchronism with the movement of the conveyor carrying the forming units of Figs. 20 and 21, such means not being illustrated in the accompanying drawings.

Also, it is to be considered within the purview of this invention that the deflectors 69 may be omitted, using only the charge guides 70 shown in Figs. 1 and 2; in which event care must be taken that the horizontal component of velocity of the charges in the direction of movement of the conveyor be no greater than the horizontal velocity of the conveyor in the same direction.

It has been found, however, that when using the preferred form of charge supplying means, shown in Figs. 1 and 2, a substantial variance may be permitted in the synchronism between the supplying of the charges 65 and the movement of the conveyor, including the molds 67 to be charged. When employing the means shown in Figs. 3, 20 or 21, or in which one of the elements 69 and 70 are omitted, the charges may still be fed, but the requirements for synchronism between the supplying of charges and the movement of the conveyor are more exact. The extended portion 71 of the member 70 of Figs. 1 and 2 is effective to receive charges of material to be formed over a substantial period in the movement of the forming units, so that the requirements for exact synchronism are not rigid.

ARTICLE FORMING UNITS—CONSTRUCTION AND OPERATION

As stated above, many principles of the present machine are adaptable to the forming of articles from different types of plastic materials. In so far as the claims are sufficiently broad to cover the forming of such materials and in so far as the apparatus recited in any claim is adaptable for fabricating different types of materials, those claims are to be construed broadly enough to include such operations. However, the present machine is disclosed as one for forming articles of hollow glassware and will be described accordingly.

Furthermore, while the present machine is arranged to form glass articles, such as bottles of the narrow neck type, it is contemplated that many of the principles disclosed herein are adaptable for making glassware by other methods and by other means, including for example the making of articles by the well known press and blow system, the making of press-formed articles and/or the making of articles of the paste mold type, such for example as incandescent lamp bulbs, tumblers, etc. The present particular disclosure should, therefore, be construed as one embodiment of the invention illustrating how narrow neck bottles of glass can be made.

*Unit base and mounting thereof*

Turning now to the drawings and referring particularly to Figs. 6, 7, 9 and 10, one link of each of the chains 11 and 12 is arranged to support a forming unit, the unit extending across between the chains 11 and 12, as particularly shown in Figs. 9 and 10. Each unit 68 is similar to the others so that but one need be described. Each unit is supported upon a base plate 75, which is positioned in respect to its carrying links by a dowel pin 76 at each end thereof, these pins being anchored in suitable sockets in the links 31 and 32, as shown in Figs. 7 and 8, and being secured therein by the provision of reduced lower end portions which are threaded to receive nuts 77 bearing against a shoulder portion of the links.

The plates 75 are secured to the links 31 and 32 by bolts 78 and 79 respectively, these bolts being similar with the exception that the bolts 78 threaded into the H-links 31 are positioned further inwardly in respect to the ends of the plates 75 than are the bolts 79 threaded into the I-links 32, as best shown in Fig. 9. Each of the bolts 78 and 79 has a relatively large portion beneath its polygonal head which passes through a somewhat larger opening in the plate 75, as shown at 80, Figs. 7 and 8. Beneath these portions, the bolts 78 and 79 are threaded and screwed into suitable threaded openings in the links 31 and 32. The bolts are tightened down so that the downwardly directed shoulder formed between the enlarged portions beneath the head and the threaded portions are tight against the associated links of the chains 11 and 12, while a slight vertical clearance is provided between the tops of the plates 75 and the undersides of the polygonal heads of the bolts. This clearance plus the diametrical clearance, as shown at 80, permits a self-adjustive movement of the plates 75 around the dowel pins 76 as may be required, due to slight irregularities in the movements of the chains 11 and 12 with respect to each other.

*Blank mold and operation thereof*

Each unit 68 as aforesaid is provided with a blank mold 67. This mold is made in the usual manner in mating half portions which are interchangeably mounted in suitable holders 81, so as to permit the substitution of blank molds having different cavity shapes for making different articles. The connection between the mold halves and the holders 81 is a pivotal one, best shown in Figs. 9, 10 and 12, a slight angular movement being permitted between the holders and the mold halves so as to provide for the accurate closing of the mold halves in respect to each other. For this purpose, the mold halves are each provided with a pair of vertically spaced ears 82 having aligned bores therein through which extends a pivot pin 83, suitable cotter pins or other equivalent means being provided as shown at 84 to prevent dislodgment of the pivot pin 83. This pin passes through aligned apertures in bifurcated end portions 85 formed at the ends of the mold holders 81. The end portions of the holders 81 preferably have a pair of spaced abutment portions 86, Fig. 9, arranged to bear against the mold halves to prevent undue rotative movement of the mold halves in respect to the holders about the vertical axes of the pins 83. This feature is, however, conventional and no invention is predicated thereon. The holders 81 are pivoted on a common vertical axis, including a pintle 87, which is mounted at its upper end in a laterally extending portion of a bracket 88 secured to the base plate 75 of the unit. The lower end of the pintle 87 is reduced in diameter and passes through an aperture in the base plate 75, being threaded therebeneath to receive a nut 89 by which the pintle is secured to the base plate.

Means are provided for opening and closing the blank mold 67 at the desired times. As shown, this means includes a pair of links 90 extending from the pins 83 to pins 91 disposed in the outer bifurcated ends of a yoke 92 and held in place therein by cotter pins as shown, or by other suitable means. The yoke 92 is mounted for horizontal sliding movement, Figs. 9 and 10, on a pair of stationary guide rods 93 which pass through bores therein. The guide rods 93 have their left-hand ends, as seen in Figs. 9 and 10, suitably secured in a lower portion of the bracket 88 which is secured in turn to the base plate 75. The right hand ends of the rods 93 are secured in a bracket 94 which is also secured to the plate 75. The yoke 92 carries a cam roller 95 arranged to be engaged on its inner or outer sides by stationary cams, such as that shown at 96, Fig. 10, carried by the uprights 2 or some other stationary part of the machine, as shown. When it is desired that the mold be closed and kept closed, the cam 96 engages the right-hand side of the rollers 95, as seen in Fig. 10 and moves the yoke 92 from right to left. When it is desired to open the blank mold, the left-hand side of the roller 95 is engaged by a cam, including a portion extending over the top of the roller in the position of the parts shown in Fig. 10 and having a depending part engaging the left hand side thereof, the yoke 92 being moved from left to right.

Suitable safety means are preferably interposed between the roller 95 and the yoke 92. For this purpose, the roller is not rigidly attached to the yoke, but rather is carried by a pin 97, Figs. 9 and 14, which in turn is carried by a slide member 98. The slide member is mounted for horizontal sliding movement in suitable guides 99 formed in a portion of the yoke 92 and is normally held in a predetermined position in respect thereto by a pair of rollers 100 carried on the inner ends of links 101 pivoted at 102 to the yoke 92. The rollers 100 are normally held in suitable notches 103 in the slide 98 by a compression spring 104 extending between suitable brackets carried by the arms 101 and urging the free ends of these arms toward each other, so as to maintain the rollers 100 in the notches 103. Thus, should the blank mold stick either in opening or closing, the rollers 100 may be forced out of the notches 103 to permit the movement of the cam roller 95 and the slide 98 in respect to the yoke 92 under the positive actuation of the cams 96 without causing such a positive movement of the yoke 92 or the mold halves as might injure the parts.

Neck ring and operation thereof

Associated with the blank mold 67 is a neck ring 105, Figs. 10, 11 and 12, which is also preferably made in mating halves in the usual manner. The halves of the neck ring are interchangeably secured in holders 106 in a manner not illustrated in the accompanying drawings. The neck ring holders 106 are pivoted on the pintle 87 on which the blank mold holders 81 are pivoted.

Means are provided for opening and closing the neck ring at the desired times. This means includes the blank mold closing means which is effective through the interlocking portions of the blank mold and neck ring, shown in Fig. 12, to close the neck ring whenever the blank mold is closed. Means must be provided, however, for opening the neck ring independently of the blank mold and for retaining the neck ring closed while the blank mold is open, which is required in transferring a blank or parison from the blank mold to the blow mold. For this purpose, the neck ring holders are provided with ears 107 to which are connected long links 108, Fig. 11, these links being pivoted at their rear ends to a crosshead 109. The crosshead 109 is mounted for transverse sliding movement upon a guide shaft 110 secured in the brackets 88 and 94 at its opposite ends in the same way as are the guide rods 93 and parallel therewith. The crosshead 109 carries a downwardly extending arm 111, Fig. 10, having at its lower end a cam roller 112, the arm 111 extending through a suitable elongate slot 113 in the plate 75. The cam roller 112 is adapted to be engaged by a suitable cam, which is not in a position to be shown in full lines in Fig. 10, but is indicated in dot and dash lines at 114 in that figure in the relation which it would occupy in respect to the forming unit, it being understood that this cam is suitably secured to the frame of the machine at an appropriate position around the path of the mold unit in order to open the neck mold at the desired time. Means are also provided for retaining the neck ring closed up to the time it is opened by the cam corresponding to that shown at 114. For this purpose, there is provided a tension spring 115, Fig. 11, extending between the arms 108 at their mid portions. It will be understood that any other suitable means might be used for opening and closing the neck ring, that shown being merely for purposes of illustration.

Combined blowhead and neck pin device

Associated with the lower end of the blank mold and neck ring during the time a charge of glass is supplied thereto and thereafter, as hereinafter described, is a combined counterblow and final blowing means and neck pin construction, generally indicated at 116, Fig. 12, the neck pin alone being important during the settling of a charge of glass in the blank mold and neck ring.

As shown, this device comprises a casing member 117 having a flange portion 118, which is secured to the underside of the plate 75 by the pins about which the blank and blow mold holders are pivoted, including the pin 87. The body portion of the casing 117 extends up through a suitable aperture in the plate 75, as shown in Fig. 12. The upper portion of the casing 117 is formed as a cylinder to receive a piston 119, the upper end of which is arranged to engage against the neck ring in the position of the part shown in Fig. 12, or against the blow mold in the position of the part shown in Fig. 13. In alignment with the cylinder-forming portion of the casing 117 is a smaller cylindrical portion 120, through which extends an annular stem portion of the piston 119, as shown at 121. To the lower end of this portion 121 is secured an annular flange member 122. Extending between the member 122 and a portion of the casing 117 is a compression spring 123 serving to keep the piston 119 retracted within the cylinder portion of the casing 117 as shown in Fig. 12.

Extending axially through the piston 119 and the extension 121 thereof is a bore in which is slidingly mounted a neck pin 124, the latter having a smaller diameter upper portion in the position of the parts shown in Fig. 12 and a larger diameter collar portion 125 intermediate its ends. This larger diameter portion limits the movement of the neck pin 124 in respect to the piston 119 by engagement with a shoulder at the upper position of the neck pin, as shown in Fig. 12, and by engagement with an inner cylindrical sleeve portion of the member 122 within the extension 121 at the retracted position of the neck pin as shown at Fig. 13.

Means are provided for actuating the neck pin to move it between the operative position thereof, shown in Fig. 12, and its inoperative position, Fig. 13. For this purpose the lower end of the neck pin is provided with a pair of spaced collar members 126 and 127 secured thereto in a suitable manner. Intermediate these members and freely slidable on the neck pin stem is a collar 128, which is spaced from the collar 127 by a compression spring 129. The collar 128 is suitably connected by a pivoted link 130, Figs. 10, 12 and 13, with one end of a lever 131, which is pivoted at 132 to a cylinder 133 rigid with the plate 75. At its opposite end the lever 131 carries a cam roller 134 arranged to engage the underside of a stationary cam 135. The cam 135 is interchangeably secured to the stationary frame of the machine. The cam roller 134 is retained against the cam by a tension spring 136 extending between the lever 131 and a suitable anchorage secured to the plate 75.

The arrangement is such that the spring 136 tends not only to retain the cam roller 134 against its associated cam 135, but also tends to retract the neck pin 124. Forward movement of the neck pin toward its operative position is effected by the cam 135 moving the lever 131 clockwise about its pivot 132 against the tension of the spring 136. This movement is provided with a safety means, however, should the neck pin engage any rigid material interfering with its movement toward its operative position, Fig. 12, due to the compression spring 129 permitting a relative movement between the collar 128 and the neck pin. Normally, however, there will be little or no relative movement at this point and the collars 126 and 128 will normally be in engagement with one another.

Thus, at the time a charge of molten glass is supplied to the blank mold, the parts will be in the position shown in Fig. 12; that is, the piston 119 will be retracted to its furthermost position under the control of the compression spring 123. The neck pin 124 will be at its innermost position, Fig. 12, so that the enlarged portion 125 is in contact with the inwardly directed shoulder within the piston 119, all under the control of the cam 135, the neck pin being held in this position under the compression of the spring 129. If desired, a slight overthrow may be provided by the cam 135, slightly compressing the spring 129, so as to insure that the neck pin will remain in its operative position.

Before the counterblowing of a charge of glass, as more particularly hereinafter described, the neck pin will be retracted, which is effected by relieving the pressure on the roll 134 by the cam 135 and permitting the spring 136 to move the lever 131 counterclockwise, as seen in Fig. 10, causing the collar 128 to engage and move the collar 126 downwardly, thus retracting the neck pin to a position in respect to the piston 119, as shown in Fig. 13. With the parts in this position, pressure may be supplied to the cylinder within the casing 117 through a pipe 137 from the timer 138, Fig. 10. The timer will be more particularly described hereinafter. This pressure tends to move the piston 119 forwardly, so that it will engage the underside of the neck ring 105, this movement being in opposition to the compression of the spring 123. Fluid pressure may pass from the underside of the piston 119 through an inclined bore 139 therein to a counterbore 140 in the upper end of the piston 119, as shown in Fig. 12. If at this time the neck pin is retracted, as just described, the fluid pressure will pass around the neck pin and into a blank to expand it to conformity with the cavity of the blank mold.

The operation of the blow head and neck pin device in final blowing an article will be described hereinafter.

Combined settle head and counterblow baffle

Arranged for association with the upper end of the blank mold in its position, as shown in Fig. 12, is a combined settle blow head and counterblow baffle 141, Fig. 10, which is arranged to fit within a tapered portion 142, Fig. 12, in the end of the blank mold. This portion of the mold acts in the usual manner as a funnel for assisting in directing charges of molten glass into the mold cavity proper. The head 141 is mounted interchangeably in an arm 143 extending laterally from a vertical actuating shaft 144, which is mounted for axial and rotative movement in a bore in the bracket 88. It will be understood that different types of heads, such as that shown at 141, for use with molds of different types, may be interchangeably associated with the outer end of the arm 143. A lower portion of the shaft 144 extends through the plate 75 and into and through the cylinder 133 and carries a piston within this cylinder. At its extreme lower end, the shaft 144 carries a pin extending laterally therefrom and bearing a cam roller 145, which is arranged for movement in a curved cam slot 146 formed in a cylindrical extension 147 secured to or formed integral with the lower head of the cylinder 133, Fig. 10. Fluid pressure may be conducted to the opposite ends of the cylinder 133 through pipes 148 and 149 leading to the timer 138.

The operation of the combined settle blow head and counterblow baffle is thus similar to that disclosed in Ingle Patent No. 1,911,119, granted May 23, 1933. With the parts in the position shown in Fig. 10, the head 141 is at its upper or inoperative position. When fluid pressure is supplied from the timer through the pipe 148 and exhausted through the pipe 149, the piston is moved downwardly within the cylinder 133, causing the downward movement of the head 141 toward the blank mold 67, the shaft 144 being simultaneously rotated to a necessary extent under the control of the cam 146 acting on the cam roller 145 to bring the head 141 into alignment with the mold cavity and particularly with the beveled opening 142 therein, whereupon the head 141 is moved vertically toward the mold to complete the positioning of the head. Upward movement of the head 141 from its operative position in respect to the mold to its inoperative position shown in Fig. 10 is effected by exhausting pressure through the pipe 148 and supplying pressure through the pipe 149, both under the control of the timer 138.

After a charge of glass has been delivered to the blank mold by the means above described, the head 141 is moved downwardly and laterally to its operative position in respect to the mold. Settle blowing pressure is then supplied through the head 141 into the upper end of the mold under the control of the timer. For this purpose, the timer supplies fluid pressure through a pipe 150, which communicates through a lateral bore with an elongate annular chamber within the bracket 88 surrounding the shaft 144. Pressure then passes through lateral bores in the shaft 144 to a central longitudinal bore 151 therein, which communicates through a lateral bore and a bore in the arm 143 with a central bore in the stem carrying the head 141. This central bore communicates with a valved aperture in the underside of the head and thence with the mold cavity. Thus, settle blowing pressure is controlled by the timer 138 and passes through the head 141 to the mold cavity.

When the head 141 is used as a counterblow baffle, it is desired that there be no opening in this head into which the glass may pass. For this reason, the aperture through the head 141 is normally closed by a spring-pressed, poppet valve shown in dotted lines at 152, Fig. 10, this valve having a stem extending axially through the bore in the head 141 and its upward extension or stem and carrying at its upper end a washer or stop 153 separated from the upper end of the stem of the head 141 by a compression spring 154. Thus the valve 152 will normally be closed, but may be opened automatically upon the supplying of settle blowing pressure through the passages above described, which will cause the opening of the valve against the compression of the spring 154.

Final blow mold

Also associated with each forming unit 68 is a final blow mold 155 preferably formed in mating halves in the conventional manner. The mounting and operation of this mold are essentially similar to those previously described for the blank mold. It will, therefore, be described but briefly. The halves of the mold 155 are interchangeably mounted in mold holders 156 by vertical pins 157 corresponding to the pins 83 for the blank mold. The holders 156 are mounted for pivotal movement upon a hinge pin 158, which is supported at its upper end in a laterally extending bracket portion 159 of a stationary bracket 160 suitably secured to the plate 75. At its lower end, the pin 158 is reduced in diameter and extends through the plate 75 and the flange 118 of the casing 117 of the blow head structure and has a suitable nut threaded thereon to hold the parts in assembled relation.

For opening and closing the blow mold, the pins 157 are connected by links 161 with the outer bifurcated ends of a yoke 162 corresponding to the blank mold operating yoke 92. The yoke 162 is mounted for sliding movement on a pair of stationary horizontal rods 163 secured in the lower portion of the bracket 160 and in a bracket 164, both of which are secured to the plate 75. The yoke 162 carries a cam roller 165 for actuation by a cam 166 interchangeably carried by the stationary frame of the machine, the actuation being similar to that described for the blank mold. A safety means, generally indicated at 167, corresponding to that shown in detail in Fig. 14 and particularly described for the blank mold, is provided in connection with the blow mold operating means.

Associated with the blow mold 155 is a bottom plate 168, Figs. 13 and 15. This bottom plate is supported through a chamber portion 169, for a purpose hereinafter described, which is removably and adjustably secured to a laterally extending arm 170, as by bolts 171 passing through vertically slotted openings in a flange portion of the arm 170 and threaded into the portion 169 of the blow mold bottom 168. The blow mold bottom can thus be adjusted in respect to the arm to compensate for slight differences in the blow molds and may be removed to provide for the substitution of blow mold bottoms of different configurations for making different articles. The arm 170 as carried by a vertical shaft 172, which extends through an axial bore in the bracket 160 and through the plate 75, carrying at its lower end a piston within a pneumatic cylinder 173. The cylinder 173 is suitably secured by its upper head, as seen in Fig. 10, to the underside of the plate 75. Adjacent to its upper end the shaft 172 carries a laterally extending pin on which is a cam roller 174 which is arranged to travel in a cam slot 175 formed within an arcuate stationary member 176. The member 176 is suitably secured to the upper end of the bracket 160 and also carries the charge guiding means 69 and 70, as shown in Fig. 10.

The cam slot 175 is so shaped that when the blow mold bottom is removed from the mold carrying a completed article therewith, as shown in Fig. 10, it will move in an arcuate path to a sufficient extent laterally that the upper end of the member 169 will clear the lower end of the charge guiding means 69 and 70. Then the movement will be substantially vertical, followed by a further arcuate movement after the bottle has been raised sufficiently so that its lower (neck) end clears the blow mold halves, which of course are open at this time, thus bringing the bottom plate, which also serves as a takeout means, in a manner hereinafter to be more particularly described, to the position shown in Fig. 10. At this position the completed articles may be discharged over a chute (not shown) or to any desired means by which they may be taken to a desired point for further treatment, such as annealing. The movements of the blow mold bottom in moving between its position in cooperation with the blow mold, Fig. 13, and its inoperative position shown in Fig. 10 will be controlled by the cylinder 173. Pressure may be conducted to the opposite ends of the cylinder 173 through pipes 177 and 178 from the timer 138.

The arrangement disclosed is one in which the blank and blow molds close about the same center, that is, a glass article is completely formed in a single position in respect to the forming unit 68, the cycle being such that for the transfer of the blank or parison from the blank mold to the blow mold, the head 141 is moved to its inoperative position, as shown in Fig. 10 and the blank mold is opened leaving the blank or parison depending from the neck ring, which is uppermost at this time due to the unit having been inverted and moving on the lower run of the conveyor. The blow mold is thereafter closed about the suspended blank, a suitable time being provided for reheating the blank between the opening of the blank mold and the initiation of the application of final blowing pressure in the blow mold. The final blowing may take place either with or without the neck ring closed and in engagement with the neck portion of the article. In the event that the neck ring is to remain closed during the final blowing operation, final blowing pressure is supplied from the timer through the pipe 137 and passes in the same manner through the blow head 116 as previously described for counterblowing. If, on the other hand, final blowing is to take place without the neck ring, as shown particularly in Fig. 13, then after the blow mold has been closed, the neck ring is opened by the means previously described for that purpose, whereupon final blowing pressure is supplied through the pipe 137 as aforesaid. This blowing pressure is effective first to cause the forward movement of the piston 119 in its cylinder until it engages a suitable stop, which in this instance is the end of the blow mold at the position of the parts shown in Fig. 13. Then the pressure from the pipe 137 passes through the inclined passage 139 thence through the counterbore 140 and around the neck of the article to the interior thereof to expand it to final form in the blow mold.

*Vacuum takeout means*

The present machine employs vacuum through the blow mold bottom plate for retaining the completed articles in adhering relation thereto during the removal of the articles from the blow molds. Various means have been suggested in the past for applying vacuum in this general manner and for the same general purpose. However, all such means have employed open passages, such as bores or slots, through the blow mold bottom. This type of construction involves either one or both of two objections. In the first place, if the slots are of relatively large total area, as is desirable in order that the vacuum may be effective on a relatively large area of the bottom of the article, then there are apertures of substantial size through the blow mold bottom into which the glass may penetrate during the final blowing operation, thus rendering the bottom of the article unsightly and possibly defective. If, on the other hand, the apertures or slots be relatively small in order to prevent the marking or other deformation of the bottoms of the articles, the area on which the vacuum is effective for retaining the article on the bottom plate is relatively small and articles may tend to fall off the bottom plate before that action is desired, thus possibly breaking the bottles and littering up the machine with broken glass or otherwise interfering with the operation thereof.

The present invention provides a novel arrangement wherein there are no open passages whatsoever into which glass may penetrate in the bottom plate during the final blowing of an article, due to the fact that a relatively large beveled opening is provided, as shown at 179, Fig. 15, which is closed during the final blowing operation by a poppet type valve 180. This valve is carried by a stem 181 which extends loosely through a bore 182 leading from the beveled opening 179 to a chamber 183 in the portion 169 of the bottom plate device. At its upper end, as seen in Fig. 15, the stem 181 is secured to the center of a flexible metallic diaphragm 184, which divides the chamber 183 into two portions, including a lower portion communicating with the passage 182 and to which vacuum is applied, and an upper portion 185. The upper chamber portion 185 is in constant communication with the atmosphere through an opening 186 in the head 187 by which the top of the chamber is closed, this head being preferably threaded into the portion 169, as shown. The periphery of the diaphragm 184 may desirably be confined between the lower threaded end portion of the head 187 and the adjacent portion of the chamber portion 169 as shown. Surrounding the stem 182 and preferably threaded thereon within the chamber 183 is a sleeve 188, which is adapted to act as a stop to predetermine the open position of the valve 180.

The diaphragm 184 is so constructed and arranged that during the final blowing operation, at which time the pressure within the chamber 183 is substantially atmospheric, the valve 180 will be closed due to the resilient action of the diaphragm and will be held in closed position due to the expansion of the glass in the mold. When, however, it is desired to retain an article in engagement with the bottom plate, vacuum is applied to the chamber 183 causing the diaphragm to flex and unseating the valve 180 by a downward movement of the stem 182, as shown in Fig. 15. This action takes place after final blowing pressure has been cut off and just before the final blow mold is to open, after the bottom of the article has been to a large extent rigidified, so that it will not be deformed or substantially marked by the forward movement of the valve, although it will be bent inwardly, as shown in Fig. 15, to provide a substantial space as indicated at 189 between the bottom plate and the bottom of the article surrounding the valve 180. This provides a relatively large area of the bottom of the article on which the vacuum is effective, much larger than would be possible if continuously open slots were employed through the bottom plate, as in the prior art.

Means are provided for supplying vacuum to the chamber 183 under the control of the timer 138. For this purpose, the chamber 183 has a passage 190 extending laterally therethrough opposite an elongate slot 191 in the head of the arm 170 to which the portion 169 is secured. This slot communicates through a bore 192 in the arm 170 with an annular chamber within the inner end of the arm surrounding the shaft 172. The shaft 172 has an axial bore extending a substantial distance therethrough which communicates through a lateral bore with the annular chamber within the inner end of the arm 170 and communicates through another lateral bore 193 with an elongate annular chamber within the bracket 160. This elongate annular chamber communicates through a pipe 194 with the timer 138 by which the application of vacuum is controlled.

Thus, when vacuum is applied to the chamber 183 under the control of the timer, the valve 180 will be automatically opened by the actuation of the diaphragm 184 to press in the bottom of the article, as shown in Fig. 15, to permit the application of vacuum to a relatively large portion of the area of the bottom of the article, so that the article may be retained in adhering relation to the bottom plate, as shown in Fig. 10, up to the time when it is to be discharged from the machine. This discharge is effected by the cutting off of vacuum by the timer, whereupon atmospheric pressure is established through the timer and the several vacuum passages to the space within the bottom plate, permitting the closing of the valve 180 by the diaphragm 184 and the discharge of the article in a suitable manner.

The timer

As above set forth, various operations of the forming unit are controlled by the timer 138, which controls the application of pneumatic pressure for the cylinders 133 and 173 and for settle blowing, counterblowing and final blowing the articles as well as for the application of vacuum to the takeout means. The timer 138 is illustrated in Figs. 10, 16, 17 and 18, and comprises a casing generally indicated at 195 to which fluid pressure is supplied through a pipe 196 from the chain 12 communicating with the lower end of a bore 197 and vacuum is supplied through the pipe 42 communicating with a short bore 198 aligned with the bore 197, but not communicating therewith, as shown in Fig. 17. The casing 195 is secured to a stationary part of the forming unit, in this case the cylinder 173, by suitable bolts, Fig. 10. The timer has a plurality of piston valves arranged in lateral bores therein, these valves being similar to each other, so that but one need be described in detail.

As shown, particularly in Fig. 18, each valve except as hereinafter described comprises a piston member 199 having a non-circular stem 200 extending through a similarly shaped opening in a plate 201 of the casing 195, the stem 200 carrying a cam roller 202 at its outer end. The cam roller 202 is arranged to be actuated as shown in Fig. 10 by a suitable stationary cam 203 interchangeably secured to one of the stationary frame members 2 of the machine. A separate cam 203 is provided for each of the valves, each cam including portions arranged to contact with the inner or outer faces of the cam rollers or both, as particularly shown in Fig. 16. Fluid pressure is supplied from the passage 197 through a lateral bore 204 to the cylinder in which the piston 199 slides. This pressure may be supplied through either of the pipes 148 or 149 as shown, Fig. 18, depending upon the position of the piston valve within the cylinder, the pipe not being supplied with pressure being exhausted through one or the other of the exhaust passages 205 in the well-known manner.

This valve construction is employed for the valves controlling the pressure to the cylinders 133 and 173, the remaining valves having but one pipe leading from them to the operating units. For this purpose the pipe corresponding to the pipe 148, Fig. 18, is omitted and no port is provided therefor in the valve casing 195. The exhaust passage corresponding to the left-hand bore 205, Fig. 18, is also omitted. Otherwise the valve arrangement may be identical.

General cycle and summary

Figure 19:
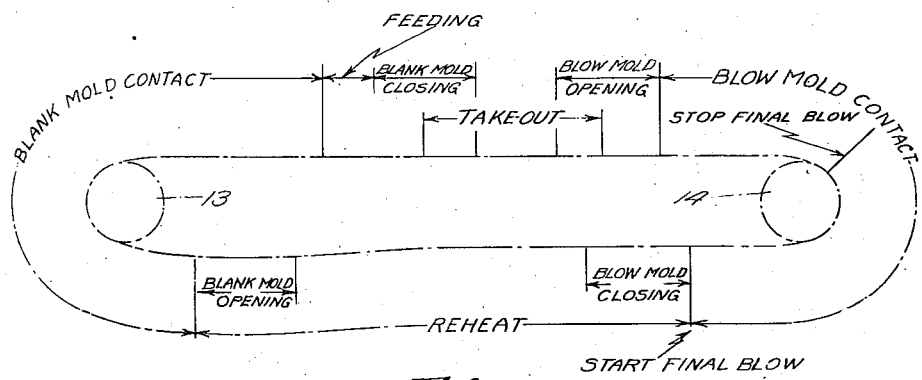
Fig. 19 is a diagrammatic illustration showing one possible cycle of the operation of the machine as a whole.

The general cycle of the machine may be as diagrammatically illustrated in Fig. 19, wherein charges of plastic material are supplied to the blank molds 67 during the movement of the units through the upper substantially horizontal run of the chain. Thus, charges are formed into blanks or parisons during the period of "blank mold contact," which is intended to include settle blowing and counterblowing in the usual manner and as previously described. The blank molds are preferably opened to initiate reheating of the blanks of glass while they are in a neck-up position, so as to permit the stretching of the blanks or parisons under the influence of gravity. At a suitable time the blow mold 155 is closed and pressure is applied either through the neck ring 165 or after the neck ring has been opened for final blowing the blanks. The blow mold contact, which occurs from an instant after final blowing pressure is applied up to the time the blow mold is opened, preferably occurs during a period in which the mold unit, including the blank and blow molds, passes from the lower to the upper run of the conveyor, although the actual application of final blowing pressure may cease at some selected time prior to the actual opening of the blow mold, as indicated. Just prior to the opening of the blow mold and after final blowing pressure has been cut off, vacuum is applied to the bottom plate 166 to retain the article in engagement therewith, so that upon the opening of the blow mold, and also of the neck ring, if it has not previously been opened, the article may be removed by the movement of the bottom plate to the position shown in Fig. 10, whereupon the completely formed article may be discharged in any suitable manner.

It will be understood that the blank and blow molds and the neck ring, and also the parts used therewith in the forming of an article, such for example as the neck pin, the combined settle blow head and counterblow baffle, and the final blow bottom plate, are all preferably removable and interchangeable to provide for the making of articles of different shapes.

It will also be understood that all the actuating cams are preferably removable and interchangeably and/or adjustably associated with the machine so that a different cycle may be employed, either by shifting the same cams to accomplish the same functions at different parts of the path of the unit or by substituting other cams, or both.

While there is herein shown and described but one principal embodiment of the invention and certain possible variations of certain portions thereof, I do not wish to be limited except by the scope of the appended claims, which are to be construed as broadly as the state of the prior art permits.

I claim:

1. Apparatus for forming hollow articles from moldable charges of plastic material, comprising a single chain-type conveyor, means for moving said conveyor in a non-circular orbital path, and a plurality of complete article-forming units carried by said conveyor, each of said units comprising a blank mold and a cooperative final blow mold.

2. Apparatus in accordance with claim 1, wherein said conveyor is moved continuously.

3. Apparatus for forming hollow glass articles, such as bottles of the narrow neck type, comprising a single chain-type conveyor, means for moving said conveyor continuously in a non-circular orbital path, a plurality of article-forming units, each of said units including a blank mold, a blow mold, a neck ring and a neck pin, all carried by said conveyor for movement therewith, means for opening and closing said molds and said neck ring, means for actuating said neck pin to move it to and from a position in operative relation to said neck ring, means for settle blowing a charge of molten glass introduced into said blank mold, means for thereafter counterblowing the settled glass in said blank mold to form a blank or parison, and means for final blowing a parison in said blow mold to form a completed article.

4. In combination, a single chain-type conveyor including a plurality of hollow links, passage means connecting the hollow portions of said links to form an endless chamber, means for moving said conveyor continuously in a non-circular orbital path, a plurality of operating units carried by said conveyor, each including a movable member and a pneumatic motor for actuating said movable motor, and means for continuously supplying pneumatic pressure to said endless chamber, and means for supplying pneumatic pressure from said endless chamber to said units for operating the pneumatic motor thereof.

5. In combination, a support, an endless, chain-type conveyor mounted on said support for movement in respect thereto in a non-circular orbital path, said conveyor including a plurality of hollow links, passage means connecting hollow portions of said links to form an endless chamber, means for moving said conveyor continuously in said path, a plurality of operating units carried by said conveyor, each of said units being operable by pressure fluid, movable members employing pressure fluid in connection with the operations thereof and carried by said conveyor respectively in association with said operating units for movement with said conveyor and for other movements by the associate operating units, means for continuously supplying said fluid to said endless chamber and means for intermittently delivering pressure fluid from said endless chamber to said units and to said movable members in association with said units during the continuous movement thereof by said conveyor.

6. In combination, a support, an endless chain-type conveyor carried by said support and arranged for movement in respect thereto in a non-circular orbital path, a hollow sprocket wheel rotatably mounted on said support for engagement with said conveyor, a series of hollow links forming a part of said conveyor and together making an endless chain, said links passing around said sprocket wheel, means interconnecting said hollow links and constructed and arranged so that the hollow spaces in said links communicate with each other but are out of communication with the atmosphere so that the endless chain formed of said links forms a continuous chamber or passage extending entirely therethrough, means for supplying vacuum to the interior of said sprocket wheel, means for continuously conducting the vacuum from the interior of said sprocket wheel to the chamber or passage within said links, a plurality of operating units carried by said conveyor and mechanically connected to said links, each of said operating units comprising a vacuum chamber having a diaphragm operatively mounted therein and a movable member having a driven connection with the diaphragm, and means for conducting the vacuum from the chamber or passage within said links to the vacuum chamber of each of said operating units.

7. Apparatus in accordance with claim 30, wherein a plurality of operating units are carried by said conveyor, each of which includes operating means actuated by cam followers, and stationary cams located adjacent to the path of said conveyor for actuating said operating means in response to the continuous movement of said conveyor.

8. Apparatus for supplying charges of plastic material in a moldable condition to a plurality of forming molds moving continuously in a predetermined straight path, comprising means to deliver charges of said material downwardly at a single point, stationary guiding means to receive charges and to cause them, upon leaving the stationary guiding means, to move in a downwardly inclined path lying in the vertical plane including the path of the molds, and charge-guiding means moving in the same direction and at substantially the same speed as the molds to guide the charges from said stationary guiding means into the molds.

9. Apparatus in accordance with claim 8, wherein said stationary guiding means are so constructed and arranged that the charges at the time they leave said stationary guiding means have a component of movement parallel with the movement of the molds and in the same direction.

10. Apparatus in accordance with claim 8, wherein said stationary guiding means are so constructed and arranged that the charges of plastic material at the time they leave said stationary guiding means will have a component of velocity parallel with the movement of the molds and in the opposite direction.

11. Apparatus for supplying charges of plastic material in a moldable condition to a plurality of forming molds moving continuously in a predetermined straight horizontal portion of an endless path, comprising a stationary inclined chute for receiving charges of plastic material from a delivery means and constructed and arranged to direct them in a path lying in the vertical plane including the path of the molds and so that said charges on leaving said chute have a component of movement in the same direction as and parallel with the movement of the molds in said straight portion of their path, an endless conveyor by which said molds are carried, and charge guiding means for each of said molds carried by said conveyor for guiding charges of plastic material from said inclined chute into said molds during the continuous movement of the latter.

12. Apparatus in accordance with claim 11, wherein said inclined chute is so constructed and arranged as to impart to the charges of plastic material a velocity as they leave said inclined chute having a horizontal component in the same direction as and greater than the velocity of the movement of the molds in the portion of their path during which charges are supplied thereto, and wherein the charge guiding means moving with the molds comprises deflectors having charge guiding surfaces which are concavely curved in longitudinal configuration.

13. Apparatus for forming hollow articles, such as bottles, of the narrow neck type from plastic material in a moldable condition, comprising an openable and closable blank mold, an openable and closable neck ring, and an openable and closable blow mold, an endless chain-type conveyor carrying said blank mold, said neck ring and said blow mold for movements with said conveyor along a non-circular orbital path lying in a substantially vertical plane, means for driving said conveyor, means for opening and closing said molds and said neck ring, a combined blow head and neck pin device also carried by said conveyor in position to cooperate with said blank mold and said neck ring when they are closed and the blow mold is open in the forming of a charge of the plastic material into a blank or parison and thereafter to cooperate with said blow mold after said blank mold and neck ring have been opened and the blow mold has been closed in the final blowing of such blank or parison to form a completed article, means associated with said blow head device for moving said neck pin to and from its operative position when said blow head device is in cooperation with said neck ring, and means for supplying pressure through said blow head device for counterblowing a blank or parison in said blank mold and thereafter for blowing such blank or parison to final form in said blow mold.

14. Apparatus in accordance with claim 13, wherein said combined blow head and neck pin device comprises an outer casing forming a cylinder arranged in alignment with said molds when they are closed respectively, a piston in said cylinder, one end of which is arranged to cooperate with said neck ring during the counterblowing of a blank to form a parison, and subsequent to the opening of said neck ring, directly with said blow mold for the final blowing of an article, resilient means tending to retract said piston, said piston having an axial passage in which said neck pin is slidably disposed, and wherein said means for supplying pressure through said blow head device includes means for supplying fluid pressure to said cylinder on the side of said piston distant from said molds for moving said piston forwardly, and a bleed opening through said piston through which pressure may pass for expanding plastic material within said molds.

15. Apparatus for forming hollow articles from plastic material, comprising a combined bottom plate for a glass forming mold and takeout means cooperable with said mold, a vacuum passage through said bottom plate, a poppet valve controlling the entrance to said vacuum passage from the mold cavity and having a head forming a part of the wall of said cavity when the valve is closed, means for applying vacuum to said passage, and means for imparting opening and closing movements to said valve, said last-named means being constructed and arranged to be operable by vacuum in said passage to cause opening of said valve.

16. Apparatus for forming articles from plastic material, comprising a single endless chain-type conveyor mounted for movement in an orbital path including two curved portions and two straight portions intermediate said curved portions, a plurality of similar forming units, each comprising a blank mold, a neck ring, and a final blow mold carried by said conveyor in cooperative relation with one another, and means cooperating therewith to form charges of the plastic material into hollow articles of the final shape desired during the movement of the units along both the straight and curved portions of said conveyor path.

17. Apparatus in accordance with claim 16, wherein timing and operating means are provided for controlling the forming operations of each unit, said timing and operating means being constructed and arranged to cause the forming operations of each unit in the forming of a single article during the movement of that unit through a major portion of a complete circuit in the orbital travel of said conveyor.

18. Apparatus for forming hollow glass articles, comprising an endless chain-type conveyor mounted for movement in an orbital path disposed in a substantially vertical plane and including upper and lower runs, means for moving said conveyor continuously in its path, a plurality of neck rings mounted on said conveyor for movement therewith so that each neck ring is disposed in inverted position during its movement along said upper run of the conveyor and in upright position during its movement along said lower run, a plurality of blank molds carried by said conveyor so that each said mold is cooperatively associated with a neck ring during the movement of the latter from the upper to the lower run of the conveyor path, means for cooperating with the cooperatively associated blank molds and neck rings to form charges of glass therein into blanks or parisons, the aforesaid means being so constructed and arranged that a blank or parison is formed in each blank mold and its associate neck ring during the movement of these associated parts from the upper to the lower run of the conveyor path, means for opening said blank molds independently of their associate neck rings during movement thereof along the lower run of the conveyor path, whereby blanks or parisons formed in said blank molds and their associate neck rings may be reheated in neck-up position while suspended from the neck rings during the movement of said neck rings through a part of the lower run of the conveyor path, and a plurality of blow molds cooperable with said neck rings for the final blowing of blanks or parisons formed as aforesaid.

19. Apparatus for forming articles from plastic material, comprising a single endless chain-type conveyor mounted for movement in an orbital path disposed in a substantially vertical plane, said path including upper and lower substantially horizontal runs, a plurality of similar article forming units carried by said conveyor, said units being constructed and arranged to be supplied with charges of plastic material during the movement thereof through the upper run in the movement of said conveyor, means associated with each unit for forming articles therein during the movement of said unit through a part of the lower run of said conveyor, and means for removing completed articles from said units during movement of the latter along the upper run of the conveyor path.

20. Apparatus for forming hollow glass articles, such as bottles, comprising a single endless chain-type conveyor mounted for movement in an orbital path in a substantially vertical plane, means for moving said conveyor in its path, a plurality of forming units, each unit including a blank mold, and a neck ring, means for mounting said blank mold of each unit on said conveyor so that it will be in neck-down position during the movement of said mold through the upper run of the conveyor path, so as to provide for the receipt of a charge of glass in said blank mold through its open bottom end which is uppermost during the charging of this mold, means for mounting said neck ring of each unit on said conveyor in cooperative relation with said blank mold, means for forming blanks in said cooperative blank mold and neck ring, and means for opening said blank mold independently of said neck ring to free a blank from the blank mold after the cooperative blank mold and neck ring have been moved from the upper to the lower run of said conveyor, whereby the blank may be reheated out of contact with any body mold and in neck-up position while moving along the lower run of the conveyor.

21. Apparatus for forming hollow glass articles, such as bottles of the narrow neck type, comprising an endless chain-type conveyor, means for supporting said conveyor for movement in a non-circular orbital path lying in a substantial vertical plane, means for driving said conveyor, a support mounted on said conveyor, a blank mold and a blow mold, each comprising cooperative halves pivotally mounted on said support in neck-down position when said support is in an upper part of its path of movement by the conveyor, a neck ring comprising a pair of cooperative halves pivotally mounted on said support for cooperation with said blank mold, means for opening and closing said molds and said neck ring for the transfer of a blank from said blank mold to said blow mold and for the release of a completed article from said blow mold, means for forming blanks in said blank mold and said neck ring, and means including a blow mold bottom on said support for final blowing a blank in said blow mold.

22. Apparatus for forming hollow glass articles, such as bottles of the narrow neck type, comprising an endless chain-type conveyor, means for supporting said conveyor for movement in a non-circular orbital path lying in a substantially vertical plane, means for driving said conveyor, a support mounted on said conveyor for movement therewith, a blank mold and a blow mold, each comprising cooperative halves pivotally mounted on said support so that said molds may be alternately closed about a common axis, a neck ring comprising a pair of cooperative halves pivotally mounted on said support for cooperation with said molds, means for opening and closing said molds and said neck ring about said common axis, means for forming blanks in said blank mold and said neck ring, and means including a blow mold bottom and an air pressure supplying means on said support for final blowing a blank in said blow mold.

23. Apparatus for forming hollow articles from charges of plastic material comprising a single chain-type conveyor, means for moving said conveyor in a non-circular orbital path, a series of spaced blank molds carried by said conveyor for movement therewith, each of said blank molds being adapted to receive one of said charges, means to cooperate with said blank molds to form the charges therein into blanks, a series of spaced blow molds carried by said conveyor for movement therewith, each of said blow molds being located adjacent to a blank mold and being adapted to receive a blank that has been formed in the latter, means for transferring blanks from the blank molds to the adjacent blow molds, and means for blowing the blanks in the blow molds to form therein hollow articles of the final form desired.

24. Apparatus for forming hollow glass articles, such as bottles of the narrow neck type, from mold charges of molten glass, comprising a single chain-type conveyor, means for moving said conveyor in a non-circular orbital path, a series of blank-forming units, each comprising a blank body mold consisting of openable and closable halves carried by the conveyor for movement with the latter, a neck mold located at one end of the blank body mold and consisting of openable and closable halves also carried by said conveyor for movement therewith, each of said blank-forming units being adapted when the blank body mold and neck mold components thereof are closed to receive a charge of molten glass, means for acting upon the charges in said blank-forming units to form said charges into blanks having neck portions in the neck molds and hollow bodies in the associate blank body molds, a series of blow molds, each comprising a pair of openable and closable halves carried by the conveyor adjacent to a blank forming unit for movement with the conveyor and for movements relative thereto between open positions clear of the adjacent blank forming unit and closed positions about a blank supported by the neck mold of said adjacent blank forming unit when the blank body mold of the latter has been opened, means for opening and closing said adjacent blank body and blow molds, respectively, in timed relation with each other, and means for blowing each blank to final form in its blow mold.

25. Apparatus in accordance with claim 3 wherein said means for opening and closing said molds and said neck ring, and said means for actuating said neck pin include stationary cams located adjacent to said path of movement of said conveyor.

26. Apparatus in accordance with claim 3 wherein said means for settle blowing a charge of molten glass introduced into said blank mold includes a settle blow head carried by said conveyor for movement therewith and also for movements relative to said conveyor and said blank mold to and from operative position in relation to the latter, means including a pneumatic motor for moving said settle blow head relative to said conveyor and to said blank mold to and from its said operative position, and means for timing the applications of pressure fluid to said settle blow head and said pneumatic motor, respectively.

27. Apparatus in accordance with claim 3 wherein the means for counterblowing the settled glass in the blank mold includes a counterblow head carried by said conveyor for movement therewith and also for movements relative to said conveyor and said blank mold to and from operative position in relation to the latter, means including a pneumatic motor for moving said counterblow head relative to said conveyor and said blank mold to and from its said operative position, and means for timing the applications of pressure fluid to said counterblow head and said pneumatic motor, respectively.

28. Apparatus in accordance with claim 3 wherein the means for final blowing a parison in said blow mold to form a completed article includes a blow head carried by said conveyor for movement therewith and also for movements relative to said conveyor and to said blow mold to and from operative position in relation to the latter, means including a pneumatic motor for moving said blow head relative to said conveyor and to said blow mold, and means for timing the applications of pressure fluid to said blow head and said pneumatic motor, respectively.

29. Apparatus in accordance with claim 6 wherein the means for continuously conducting the fluid from the interior of said sprocket wheel to the endless chamber or passage within said links includes a series of spaced openings in the peripheral wall of said hollow sprocket and cooperative spaced openings in the walls of some of said links, each of said last named openings being located in position to register with one of the openings in the periphery of the sprocket wheel during part of the movement of the link containing that opening around said sprocket wheel, and spring pressed valves constructed and arranged to be opened by fluid pressure in said registering openings to permit passage of fluid through the registering openings from the interior of the sprocket to the endless chamber or passage within said links and to prevent escape of fluid through such openings when they are out of register with each other.

30. In combination, an endless chain conveyor, a drive sprocket engaging said conveyor and about which it is trained, said chain conveyor having links of relatively large size in respect to the diameter of the drive sprocket, said sprocket being mounted for rotation about a horizontal axis, an idler sprocket spaced horizontally from said drive sprocket and cooperating with the latter to support said conveyor so that the runs thereof between said sprockets are substantially horizontal with one run located directly above the other, means for rotating said drive sprocket continuously at a uniform speed in the direction to move the upper run of the conveyor towards said drive sprocket, guiding means for the upper run of the conveyor, said guiding means including a stationary guide bar extending beneath the upper run of the conveyor from the direction of the idler sprocket for a sufficient part of the distance around the drive sprocket to guide the links of the moving chain conveyor into contact with the drive sprocket uniformly so as to obviate loping of the chain conveyor.

31. Apparatus in accordance with claim 8, wherein said stationary charge guiding means comprises an inclined chute, and the moving charge guiding means comprises a plurality of deflectors and an endless chain conveyor carrying said deflectors for movement along an endless path having a portion located above and parallel with a portion of the path of the molds, and means for driving said conveyor to move said deflectors at the same speed and in the same direction as the molds during the movements of said deflectors and said molds along said parallel portions of their respective paths.

32. Apparatus in accordance with claim 11 wherein the charge guiding means individual to and moving with said molds comprises chutes having charge supporting and guiding surfaces which are convexly curved in longitudinal configuration, each of said last named chutes having an upwardly and rearwardly inclined upper end portion projecting a substantial distance rearwardly beyond the place on said chute to which charges are delivered by said stationary inclined chute.

33. Apparatus in accordance with claim 11, wherein each of the charge guiding means moving with and individual to the molds comprises a charge deflecting top member and a bottom chute, said top member and said bottom chute having charge guiding surfaces which respectively are concavely and convexly curved in longitudinal configurations, the upper end portion of said bottom chute extending a substantial distance beyond the upper end of the charge deflecting top member.

34. Apparatus for forming hollow articles from plastic material, comprising a combined bottom plate for a glass forming mold and takeout means cooperable with said mold, said combined bottom plate and takeout means having a vacuum passage extending therethrough, a poppet valve controlling the entrance to said vacuum passage from the mold cavity and having a head forming a part of the wall of said cavity when the valve is closed, said valve including a stem carrying said head and extending freely through said vacuum passage, a chamber in alignment with said passage through which said stem extends, a flexible diaphragm extending across said chamber and connected to said stem, means connecting the portion of said chamber on the opposite side of said diaphragm from said valve with the atmosphere, and means for applying vacuum to said chamber between said diaphragm and said valve, the parts being so constructed and arranged that upon the application of vacuum to said chamber as aforesaid said diaphragm will be flexed to open said valve and move the center portion of the bottom of the article in contact therewith away from said bottom plate sufficiently to permit the action of vacuum on a relatively large area of the bottom of said article.

35. Apparatus for forming hollow glass articles, such as bottles, comprising a single endless chain-type conveyor mounted for movement in an orbital path in a substantially vertical plane, means for moving said conveyor in its path, a plurality of forming units, each unit including a blank mold and a neck ring, means for mounting said blank mold of each unit on said conveyor so that it will be in neck-down position during the movement of said mold through the upper run of the conveyor path, so as to provide for the receipt of a charge of glass in said blank mold through its open bottom end which is uppermost during the charging of this mold, means for mounting said neck ring of each unit on said conveyor in cooperative relation with said blank mold, means for forming blanks in said cooperative blank mold and neck ring, means for opening said blank mold to free a blank therefrom after the cooperative blank mold and neck ring have been moved from the upper to the lower run of said conveyor, whereby the blank may be reheated out of contact with any body mold and in neck-up position while moving along the lower run of the conveyor, a blow mold carried by the conveyor in association with the blank mold and the neck ring of each of said forming units, means for closing said blow mold about a suspended blank during the travel of said blow mold along the lower run of the conveyor, means for expanding a blank to final form in said blow mold, and means for removing a completed article from said blow mold.

36. Apparatus for forming hollow glass articles, such as bottles, comprising a single endless chain-type conveyor mounted for movement in an orbital path in a substantially vertical plane, means for moving said conveyor in its path, a plurality of forming units, each unit including a blank mold and a neck ring, means for mounting said blank mold of each unit on said conveyor so that it will be in neck-down position during the movement of said mold through the upper run of the conveyor path, so as to provide for the receipt of a charge of glass in said blank mold through its open bottom end which is uppermost during the charging of this mold, means for mounting said neck ring of each unit on said conveyor in cooperative relation with said blank mold, means for forming blanks in said cooperative blank mold and neck ring, means for opening said blank mold to free a blank therefrom after the cooperative blank mold and neck ring have been moved from the upper to the lower run of said conveyor, whereby the blank may be reheated out of contact with any body mold in neck-up position while moving along the lower run of the conveyor, a blow mold mounted on said conveyor in each of said forming units in position to be closed about said blank during the movement of the latter along the lower run of the conveyor, means for blowing the blank in said blow mold to final form during the movement of the blow mold from the lower to the upper run of said conveyor, and means for removing the finally blown article from said blow mold while the blow mold is traveling along the upper run of the conveyor.

ALGY J. SMITH.